(12) United States Patent
McDonnell et al.

(10) Patent No.: US 12,400,200 B2
(45) Date of Patent: Aug. 26, 2025

(54) GOLF SYSTEMS AND METHODS USING DIGITAL ASSETS

(71) Applicant: Cobra Golf Incorporated, Carlsbad, CA (US)

(72) Inventors: Michael T. McDonnell, Carlsbad, CA (US); Bryce W. Hobbs, Carlsbad, CA (US); Ryan L. Roach, Encinitas, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 377 days.

(21) Appl. No.: 17/891,481

(22) Filed: Aug. 19, 2022

(65) Prior Publication Data
US 2024/0062178 A1    Feb. 22, 2024

(51) Int. Cl.
| | |
|---|---|
| *H04L 9/08* | (2006.01) |
| *A63B 24/00* | (2006.01) |
| *A63B 69/36* | (2006.01) |
| *A63B 71/06* | (2006.01) |
| *G06Q 20/12* | (2012.01) |
| *G06Q 20/36* | (2012.01) |
| *G06Q 20/38* | (2012.01) |
| *G06Q 30/0601* | (2023.01) |
| *G06Q 50/04* | (2012.01) |
| *H04L 9/00* | (2022.01) |

(52) U.S. Cl.
CPC ..... *G06Q 20/1235* (2013.01); *A63B 24/0006* (2013.01); *A63B 24/0021* (2013.01); *A63B 24/0062* (2013.01); *A63B 69/3632* (2013.01); *A63B 69/3658* (2013.01); *A63B 71/0622* (2013.01); *G06Q 20/3674* (2013.01); *G06Q 20/382* (2013.01); *G06Q 30/0621* (2013.01); *G06Q 50/04* (2013.01); *H04L 9/50* (2022.05); *A63B 2024/0031* (2013.01); *A63B 2024/0043* (2013.01); *A63B 2024/0053* (2013.01); *A63B 2071/0638* (2013.01); *A63B 2071/0666* (2013.01); *A63B 2220/30* (2013.01); *A63B 2220/53* (2013.01); *A63B 2220/833* (2013.01); *G06Q 2220/00* (2013.01)

(58) Field of Classification Search
None
See application file for complete search history.

(56) References Cited

U.S. PATENT DOCUMENTS

| | | |
|---|---|---|
| 8,636,603 B2 | 1/2014 | Rauchholz |
| 8,641,546 B2 | 2/2014 | Rauchholz |
| 8,641,547 B2 | 2/2014 | Rauchholz |

(Continued)

FOREIGN PATENT DOCUMENTS

EP    2803062 B1    6/2017

*Primary Examiner* — Sunit Pandya
(74) *Attorney, Agent, or Firm* — Quarles & Brady LLP

(57) ABSTRACT

A method of using a non-fungible token includes generating a digital asset including a virtual object and metadata. The metadata includes attributes that are mutable by an authorized user. The method further includes minting the non-fungible token, securing ownership of the digital asset to a blockchain, providing the digital asset on a digital platform, transferring the non-fungible token to a user wallet, and updating the metadata of the digital asset based on data associated with an event. The metadata includes a URL to a site hosted remotely, off of the blockchain, where the attributes are accessible.

9 Claims, 16 Drawing Sheets

(56) References Cited

U.S. PATENT DOCUMENTS

| | | |
|---|---|---|
| 8,641,548 B2 | 2/2014 | Rauchholz et al. |
| 9,195,781 B2 | 11/2015 | Savarese et al. |
| 9,427,639 B2 | 8/2016 | Rauchholz et al. |
| 11,135,495 B2 | 10/2021 | Tuxen et al. |
| 12,056,419 B2* | 8/2024 | Bowen ................ G06F 3/04847 |
| 12,131,283 B2* | 10/2024 | Nieto ................... G06Q 10/083 |
| 2014/0221118 A1 | 8/2014 | Meadows et al. |
| 2022/0245696 A1* | 8/2022 | Davidson ............ G06F 3/04845 |
| 2024/0091610 A1* | 3/2024 | McDonnell ........ G06Q 20/3674 |
| 2024/0195614 A1* | 6/2024 | Andon ............... G06Q 10/0875 |

* cited by examiner

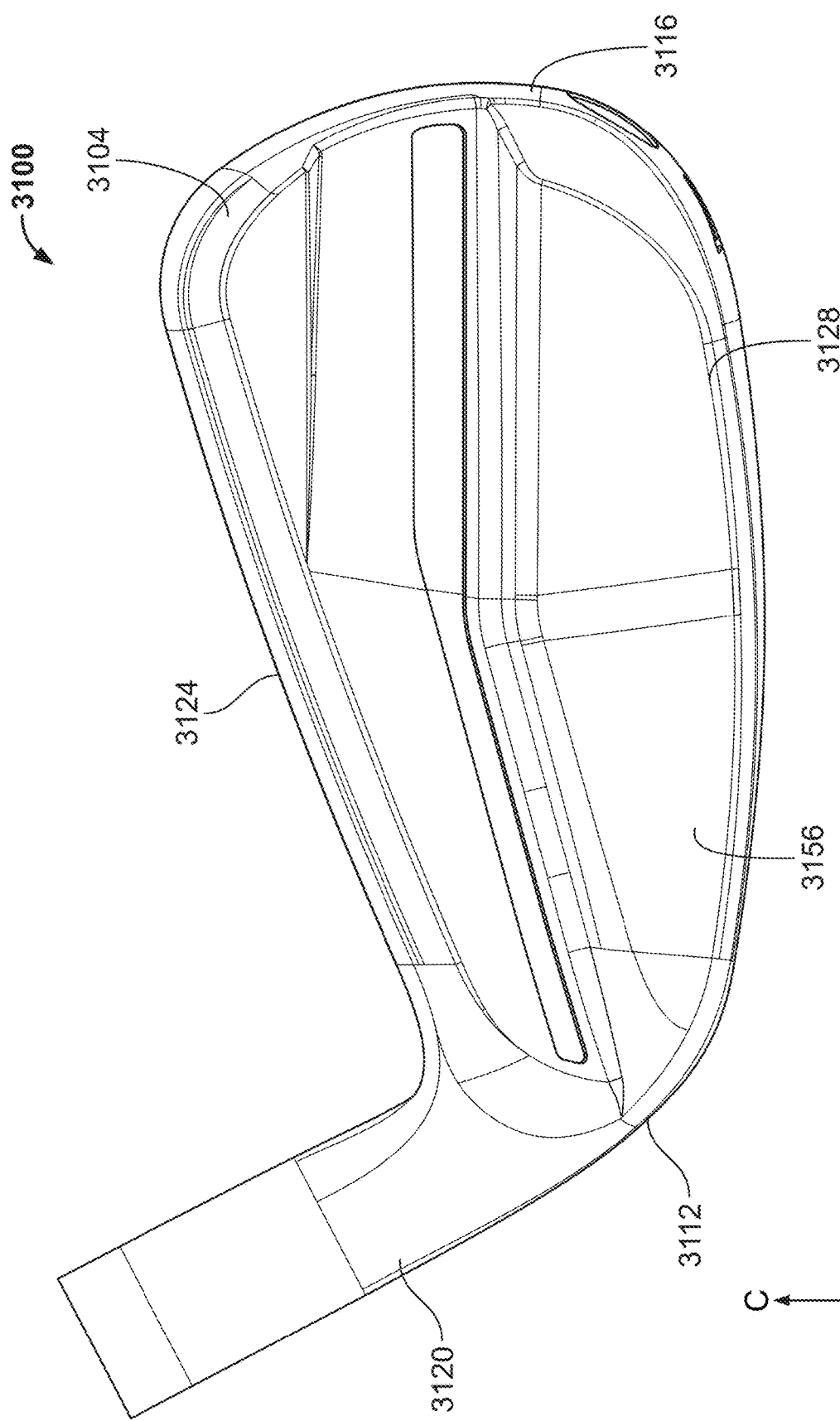
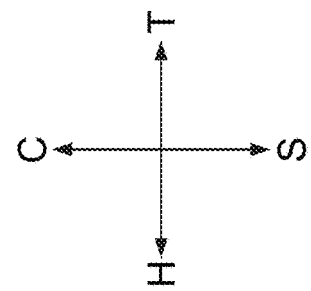
FIG. 13

GOLF SYSTEMS AND METHODS USING DIGITAL ASSETS

BACKGROUND

Golfers are often practicing on driving ranges, golf courses, or in at-home simulators. Due to the difficulty and complexity of the skills involved in playing golf, even the slightest improvements bring golfers substantial enjoyment. However, improvements can go unnoticed when golfers fail to measure or when measurements are few and far between. Further, even if measurements are taken, they often lack the level of granular detail required to track slight improvements. Even slight improvements can lead to changes in equipment settings, such as the fine tuning of golf club heads and shafts to meet the golfer's skill levels as they change.

There exists a continuing need for improvement in the ability to collect data associated with playing golf. Further, there is a need for using such data to produce custom manufactured golf clubs.

SUMMARY

In accordance with some embodiments of the disclosed subject matter, systems, methods, and media for collecting data associated with playing golf, custom manufacturing golf clubs, and methods using cryptographic tokens, e.g., non-fungible tokens, are provided.

In some aspects, a method of using a non-fungible token includes generating a digital asset including a virtual object and metadata. The metadata includes attributes that are mutable by an authorized user. The method further includes minting the non-fungible token, securing ownership of the digital asset to a blockchain, providing the digital asset on a digital platform, transferring the non-fungible token to a user wallet, and updating the metadata of the digital asset based on data associated with an event. The metadata includes a URL to a site hosted remotely, off of the blockchain, where the attributes are accessible.

In some aspects, a method of manufacturing a golf club using a non-fungible token includes minting the non-fungible token to a blockchain ledger. The non-fungible token is associated with a virtual object and metadata. At least one of the virtual object or metadata includes a design model configured to be readable by an additive manufacturing system. The method further includes providing access to a digital platform that is configured to display the non-fungible token, determining or receiving a unique owner ID associated with a user upon registration to the digital platform, recording, on the blockchain ledger, transfer of the non-fungible token to the user, receiving user data through the digital platform, modifying the design model with the user data, and receiving a request to manufacture a physical golf club corresponding to the design model of the non-fungible token, the request including the unique owner ID code of the user. In addition, the method includes manufacturing the physical golf club corresponding to the design model associated with the non-fungible token using the additive manufacturing system.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 13 depicts a rear view of an iron-type golf club head, according to an embodiment of the present disclosure;

DETAILED DESCRIPTION

Figure 1:
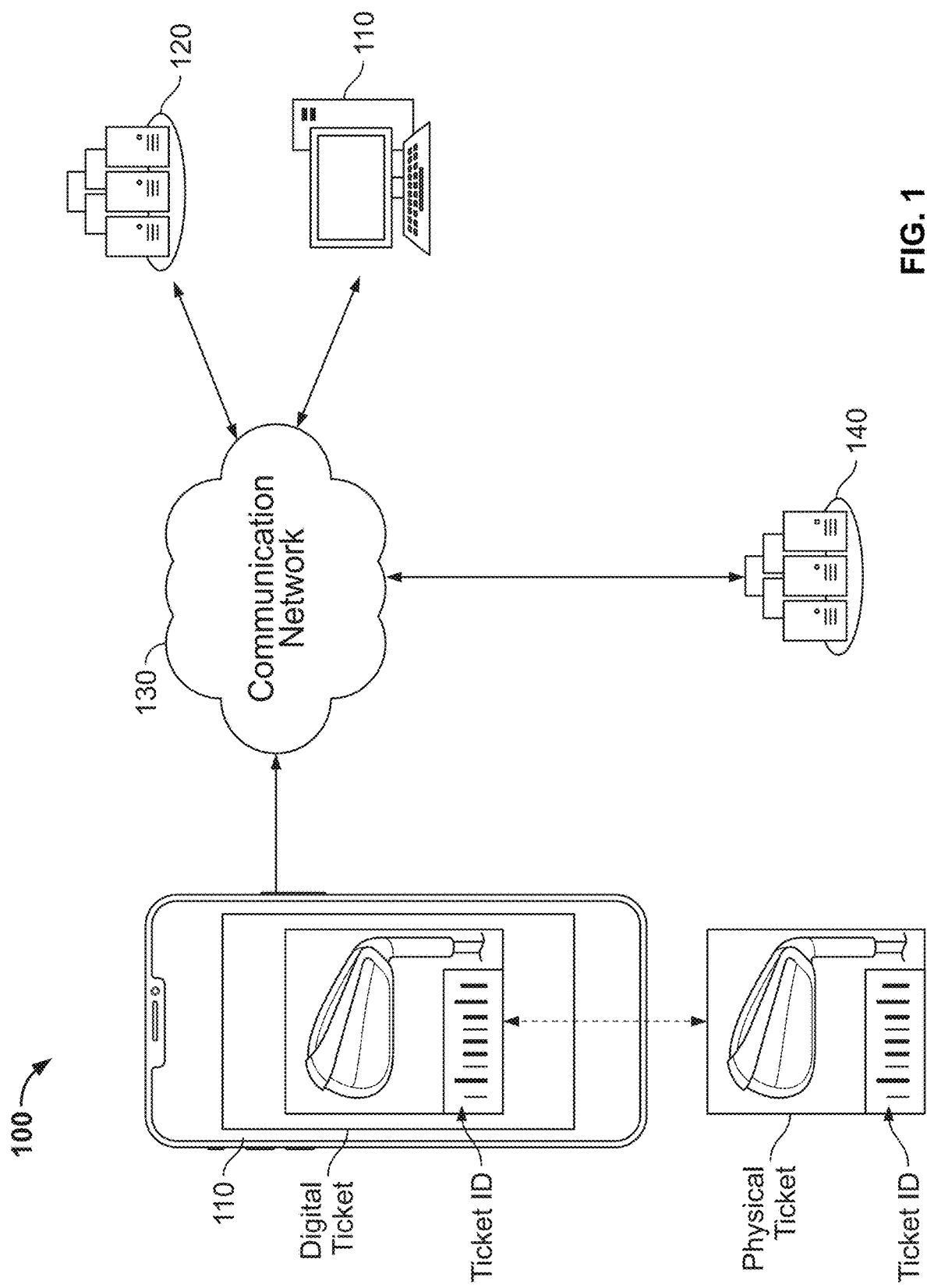
FIG. 1 depicts an example of a system for generating a non-fungible token in accordance with some embodiments of the disclosed subject matter.

The present application includes embodiments of mechanisms (e.g., systems, methods, and media) for generating digital assets secured by cryptographic tokens, e.g., non-fungible tokens (NFTs), and which correspond to physical objects (e.g., articles of apparel, or articles of footwear), or which are associated with various aspects of the play of virtual or non-virtual golf. In some embodiments, this disclosure relates to cryptographic digital assets for articles or objects, such as, e.g., tangible objects, including golf clubs, golf bags, footwear, apparel, headgear, or sporting gear, among other products, such as, e.g., watches, luggage, jewelry, storage or shipping containers, artwork, mobile phones or smartphones, tablets, televisions or other electronic devices, refrigerators or other appliances, and vehicles or other machines, or the articles or objects may be intangible objects, including graphic designs, virtual avatars or characters, graphic user interfaces, or other forms of communication.

Further, this disclosure relates to cryptographic digital assets associated with golf systems, and methods for provisioning of such cryptographic digital assets and articles, and decentralized computing systems with attendant blockchain control logic for mining, exchanging, collaborating, modifying, combining, and/or blending blockchain-enabled digital assets and articles. The presently described technology relies on the trust established in and by blockchain technology to enable a company to control the creation, distribution, expression, and use of digital objects that represent their brand. Unlike typical digital assets that are freely reproducible without loss of content or quality, the use of discrete recordation of ownership via blockchain technology eliminates the ability for simple digital reproductions of the digital objects. In doing so, the manufacturer has the ability to control or limit the overall supply of the digital objects or traits/aspects thereof and may create a controlled scarcity if so desired. The present disclosure contemplates that, in some examples, the digital object may be representative of: a ticket for admittance to an event, a proof of attendance at an event, a physical object offered for sale; a 2D or 3D design rendering or design file that may be suitable for future production; a virtual representation of an object that is not presently intended for physical creation/production; or other such objects. Further, some embodiments of the present disclosure include mechanisms for generating cryptographic tokens using virtual reality (VR), augmented reality (AR), and/or graphical user interfaces (GUIs) on computing devices.

The present application further discloses mechanisms that bridge the divide between the physical world and the digital realm. For example, according to some embodiments of the present disclosure, individuals customize a digital product, mint an NFT of the digital product, and receive a physical product corresponding to both the digital product and the NFT. In some examples, individuals purchase a physical product, receive a digital product corresponding with the physical product, and an NFT is minted of the digital product. As another example, users may purchase an NFT in connection with virtual or non-virtual attendance of an event, and the metadata of the NFT may be updated based on data collected throughout the event. In such examples, users may participate in a physical or virtual golf tournament, and may receive an NFT that is minted with metadata based on their performance in the tournament. In another example, users can purchase an NFT that can be updated based on transactions of the user with the manufacturer or retailer, and can entitle the user to certain benefits and entitlements based on the transactions. In such examples, the NFT may be updated with data associated with transactions involving the purchase of a real or virtual golf club or set of clubs, components of golf clubs, golf bags, headcovers, apparel, footwear, or other golf gear, or transactions involving the purchase of tickets or passes.

In some embodiments, NFTs can secure, authenticate, or verify ownership of digital assets having different properties and different functions. A uniform resource identifier (URI) of an NFT can be a uniform resource locator (URL) pointing to a digital asset and/or metadata associated with a digital asset that is hosted on a server of a host system. The metadata of a digital asset can further include another URL where the digital asset is hosted. For example, accessing a URI of a NFT representing a physical or digital golf club can include accessing the URI in a browser and visually inspecting the attributes, which may be presented in a code-readable format (e.g., JSON, XML, HTML, etc.). A URI of a digital asset representing a golf club may return a list of attributes, as discussed above relating to the golf club, which could be utilized by third party platforms (e.g., video game systems or digital marketplaces) to provide the owner of the digital asset some functionality or benefit. Other examples of NFTs could additionally or alternatively authenticate ownership of a digital asset including an image or design. For example, an NFT could authenticate ownership of a design that could be represented as an image hosted at the URI of the NFT, or in a URL of the metadata hosed at the URI. Ownership of both an NFT of a golf club and of an NFT for a design could entitle the owner to benefits, such as, e.g., applying the design to a virtual golf club in a video game or a metaverse, or could entitle the user to purchase a physical golf club having the design of the NFT.

In some embodiments, an NFT can function as a digital identify for an owner, and can provide access to digital markets, gateways, portals, APIs, games, or web pages which the owner would not otherwise be able to access. For example, an NFT can entitle the owner to access a webpage for a vendor that could provide the owner with the access to exclusive benefits. In some embodiments, the benefits offered could be based on the type and metadata of an NFT. For example, an NFT could represent a digital golf club, and ownership of an NFT could entitle an owner to purchase a golf club having the same description as the digital golf club, or could entitle an owner to trade the NFT for a physical golf club, or could provide the user with a discount on a physical golf club having the same properties of the digital golf club.

By way of example, and not limitation, there are presented cryptographic digital assets that are provisioned through a blockchain ledger of transaction blocks and function, in part, to connect a real-world product, such as a physical golf club or set of clubs, to a virtual collectable, such as a digital golf club or set of clubs. As used herein, the term "user" is inclusive of a consumer, a purchaser, and a registered member of an online platform. When a consumer buys a genuine golf club, a digital representation of a club may be generated, linked with the consumer, and assigned a cryptographic token, where the digital club and cryptographic token collectively represent a club NFT. The digital representation may include a computer-generated avatar of a club or a limited-edition artist rendition of the club. The digital asset may be secured by an encryption-protected block that contains a hash pointer as a link to a related block in a decentralized blockchain, a transaction timestamp, and transaction data. Using the digital asset, the buyer is enabled to securely trade or sell the tangible club, trade or sell the digital club, store the non-fungible token representing ownership of the digital club in a cryptocurrency wallet or other digital blockchain wallet, and, based on rules of acceptable club manufacturability, create a custom, made-as-new, tangible club.

Further, users can develop a personal user account that is registered with the original manufacturer of the tangible golf clubs, e.g., a Cobra Fam account, which is linked to the user's cryptographic wallet and allows the user access to a platform for viewing, purchasing, selling, trading, minting, and burning digital assets and associated cryptographic tokens that may or may not be linked to or representative of tangible goods. The user may purchase an NFT that permits access to a limited number of slots for the additive manufacture of a customized golf club or set of clubs, or any other articles or objects described above.

As used herein, "cryptographic digital assets," or simply "digital assets" may refer to any computer-generated virtual object, including digital clubs, club sets, golfing gear, footwear, apparel, headgear, avatars, art, collectables, tickets, coins, creatures, or sub-elements thereof, etc., among other virtual objects, that have a unique, non-fungible tokenized code ("token") registered on and validated by a blockchain platform or otherwise registered in an immutable database.

Further, the digital asset may include a digital-art version of a tangible, physical object or an object disassociated with tangible, physical objects. For example, the digital asset may include a digital-art version of physical golf clubs having the same or substantially the same appearance. Alternatively, the digital asset may be digital golf clubs generated within the digital realm and without being connected to or representative of physical golf clubs. Further, the digital asset may become physical through various techniques, such as by manufacturing methods based on aspects of the digital golf clubs that are taken as inputs to create the physical golf clubs.

A "smart contract" is an agreement that is in the form of a self-enforcing software program that runs on the blockchain network, so it is distributed across a blockchain network and is itself immutable. The terms within a smart contract, such as one in an NFT, are dictated by one or more of the parties. When creating a smart contract, a party or multiple parties may include programming to allow for negotiation, modification, full or partial acceptance, full or partial refusal, and, ultimately, full or partial enforcement or waiver. It will be appreciated that, as used herein, consideration is merely something of value given in exchange from one party to the other and may be real or personal property, such as, e.g., currency, or may be a return promise, an act, or forbearance. Additionally, options are contracts in which an offeree gives consideration for a promise by the offeror not to revoke an outstanding offer, and options can be provided as part of a larger contract or, alternatively, the option may be the foundation of the contract itself. A smart contract in an NFT may, but need not, be legally enforceable. The code of a smart contract can include functions for reading from or writing to the smart contract. For example, a smart contract can include a function that returns information about a digital asset, or a function returning information about an owner of a digital asset. Additionally or alternatively, a function of a smart contract could be called by an owner of the contract to distribute funds exchanged in the execution of the smart contract.

As used herein, the term "cryptographic token" is a digital value that is stored/recorded on a blockchain. Cryptographic tokens include payment tokens, such as coins (e.g., Bitcoin), utility tokens, security tokens, and "non-fungible tokens." As used herein, non-fungible token or "NFT" refers to a cryptoasset in the form of a unique, cryptographic token corresponding to a digital asset comprising a computer-generated virtual object and metadata therefor, including digital articles of footwear, and/or digital articles of apparel. The NFT may be a blockchain-based deed of digital ownership and/or certificate of authenticity of a digital asset. As used herein, an NFT is not a digital asset, but is used to signify ownership of the digital asset. The NFT can be built (e.g., minted) in accordance with contemporary and relevant standards, such as, e.g., an Ethereum Request for Comments (ERC) 721 (Non-Fungible Token Standard) or ERC1155 (Multi Token Standard) among other relevant standards and as appropriate for the particular blockchain network and applications used therewith. Further, an NFT is built or minted in accordance with the terms of a smart contract. The particular conditions and terms of a smart contract can govern details of a transaction involving the minting or transfer of an NFT, and the terms can impact the value or, at least, the perceived value of the NFT over time. For example, a smart contract can enforce a rarity of NFTs minted under the smart contract by limiting the maximum allowable number of NFTs which can be minted under the contract. In some cases, a smart contract can include terms mandating that a royalty be paid to the owner of the smart contract upon a secondary sale of an NFT. In essence, the NFT represents authentication of the transaction and serves as a record of this authentication on a blockchain ledger (e.g., Bitcoin, Ethereum, and the like). As such, the NFT itself may fluctuate in value depending on various aspects of the transaction, e.g., the parties involved, value exchanged, time and/or date, exclusivity, or combinations thereof, among other factors. Further, the number and/or frequency of transactions may also cause the NFT to fluctuate in value.

A digital asset can be accessible at a web address (i.e., the URI) that is referenced in the NFT securing it. The web address can be a link which, when accessed, can serve the digital asset, or could serve information or metadata of the digital asset. Because of a cost associated with storing information in a NFT, the token itself may contain only enough information to identify the digital asset and prove ownership, with the rest of the information about the digital asset residing on computer systems that are not themselves nodes in the blockchain. Accessing the web address can return a list of properties of the digital asset to the user through a graphical user interface, or, alternatively, in a format that is consumable by computer programs and applications that may access the digital asset. For example, the web address could return information about the digital asset in JSON format or XML, format, and the address of the digital asset itself could be included in the list of properties. A digital asset representing a golf club could thus have properties specifying the type of club, a method of manufacturing used in making the club, a shaft length, a specification of handedness, a weight of the club, etc. In some cases, an address referenced in an NFT could be an application programming interface (API) endpoint that may vary information returned to the user, or implement a function based on the HTTP method through which the API endpoint is accessed. The API endpoint could allow a user or system to perform a GET, HEAD, PUT, or POST, for example, which could allow a property of the digital asset to be changed based on the operation performed. The GET and HEAD operations can be read-only operations, and can provide publicly available information about the digital asset without the need for authentication. Access to the write operations (e.g., POST or PUT) of the API endpoint referenced in an NFT can require authentication, and could thus only be accessible to the manufacturer of the NFT and digital asset, for example.

A "Uniform Resource Identifier" or "URI" is a unique sequence of characters that identifies a logical or physical resource used by web technologies. URIs may be used to identify any resource, including non-virtual objects, such as locations or people, or digital information resources, such as web pages. The URI can comprise a "Uniform Resource Name" ("URN") or a "Uniform Resource Locator" ("URL").

Some embodiments of the present disclosure are directed to digital assets that can include computer-generated virtual or digital collectables, such as digital golf clubs, or digital articles of apparel (e.g., jackets, shirts, pants, shorts, shoes, hats, necklaces, and watches). According to some embodiments, the digital collectables may be secured and/or uniquely identified by a cryptographic token, e.g., an NFT. The digital asset may be linked and/or distributed with real-world, physical products, such as tangible golf clubs and/or tangible articles of apparel. The digital assets may be linked or distributed with a 2D or 3D design file such as a computer-aided design (CAD) model, graphical rendering, image, or drawings package from which a physical product may be constructed or otherwise represented.

Some embodiments of the present disclosure are directed to NFTs that, alternatively or additionally to representing physical or digital collectables, can authenticate ownership or entitlement to a benefit. A digital asset whose ownership is tied to an NFT, for example, could be a user's account with a manufacturer or retailer for example, which could include information about transactions made by the user, products purchased, dates of activities, cumulative totals of the value exchanged for goods or services, or any other information that could be associated with a customer account. Benefits may be accrued or provided based on the information of the digital asset, and the benefits could include access to exclusive products or designs, tickets to events, discounts on products, access to digital systems, etc. Accounts provided as digital assets secured by NFTs may provide privacy benefits to individuals that may otherwise be averse to signing up for an account with a manufacturer or retailer, as purchases and activity could be associated to the NFT, without including identifying information about the user. Further, the ability to sell or transfer ownership of an account by transferring an account NFT can provide an incentive for a user to perform activities that could result in the provision of a benefit, as doing so can enhance the value of the NFT, which ca correspond to a value of the digital asset secured by the NFT. Sales of an account or utility NFT can further provide a revenue stream to a manufacturer or retailer, as the originator of the NFT could receive a royalty for any secondary sales of the NFT. In other embodiments, an NFT could represent entitlement to a benefit, including, for example, access to restricted portions of a web site, access to exclusive events or products, entitlements to discounts, entitlements to integration with third-party applications such as games, etc.

NFTs can be created, recorded, or "minted" into the blockchain ledger stored in the blockchain network, and thereby stored in memory of one or more of the blockchain nodes. Further, such cryptographic tokens can be destroyed or "burned" by permanent removal from circulation in the blockchain network. Burning can be accomplished in a variety of ways, including by transferring ownership of the cryptographic token to a general, null address that is inaccessible and unowned. Manufacturers, also referred to herein as brands or organizations, may burn cryptographic tokens to create scarcity within the marketplace, or to trigger a condition, or as a result of a condition, or for security purposes. For example, a brand may release, e.g., "drop," a collection of digital assets secured or identified by cryptographic tokens, and then may burn any unsold cryptographic tokens within the collection to preserve exclusivity of those sold. In another example, a brand may drop a collection of digital assets secured or identified by NFTs with the condition that purchasers may only have access to their purchased digital asset when all or a particular quantity of the collection has been purchased, which may be expedited by the brand subsequently burning unsold NFTs to meet the condition prematurely.

There are several ways a user can be enabled to unlock or acquire a cryptographic asset. In one example, upon purchase of a ticket to an event, e.g., a Professional Golf Association (PGA) Tour tournament, a unique NFT and corresponding private key are automatically generated and assigned to the user's blockchain wallet. In another example, upon entrance to an event, e.g., as confirmed by geolocation via a user's smartphone, and/or scanning a digital or physical ticket terminal during first purchase, a unique NFT and corresponding private key are automatically generated and assigned to the user's blockchain wallet. In still another example, a private key is provided to the user via a printed or digital receipt, a visual or electronic ID tag (RFID or NFC) hidden in or applied to a ticket or article, a pop-up message or email sent to a personal user account, a push notification or text message sent to a smartphone, or some other record; the consumer uses the private key to link the cryptographic asset to their digital blockchain wallet. Another example may require the user to assemble the private key in part via a physical code or Unique Product Identifier (UPID), e.g., a serial number, associated with the golf club (on the packaging or box, on a hang tag, under a label, embedded within a QR code on the ticket or physical golf club or packaging, embedded within a club head or shaft, etc.) and in part via an attendance or transaction authentication code (i.e., to prevent an individual from collecting a cryptographic asset while merely handling golf clubs in a store or being nearby but outside of an event).

Another example may require the user to "seek" cryptographic assets on golf courses or at event locations, whether physical or virtual inside a metaverse or game, by using a photographic capture function or augmented reality ("AR") function on a smartphone. For this method, a private key may be provided via the validated transaction, however, the user must separately find a hidden cryptographic asset in an AR hidden within the golf course or local area before the digital asset can be transferred to their wallet (i.e., the cryptographic key and the virtual object must both be separately acquired before the transfer occurs).

In a representative example, an authenticated ticket is created and assigned a UPID. Upon purchase by a consumer, the UPID may be used to unlock a cryptographic digital asset composed of a collectable digital golf club and associated with a unique non-fungible token (NFT) on a blockchain based distributed computing platform. In general, a consumer must have or procure a blockchain wallet address (e.g., an Ethereum hardware wallet) to purchase, unlock, or acquire an NFT securing a cryptographic digital asset. The blockchain wallet may be used to store a private key belonging to the cryptographic digital asset and may be linked to a personal account that is registered with the original brand or host providing the ticket.

In some instances, the cryptographic digital asset may not be originally linked to a physical product, but instead may be gifted (e.g., by gifting or transferring an NFT securing the cryptographic digital asset) or sold as part of a brand promotion campaign, event, moment, or experience. In some instances, the brand may host or commission a raffle, a game, a contest, a tournament, or other virtual promotion campaigns, events, moments, or experiences for which digital assets may be gifted or sold, or for which NFTs may be generated as proof of attendance or as tickets for entry, among other examples.

In some embodiments, the cryptographic digital asset may not be linked to a physical product, but instead may be sold as a ticket or pass to an event, such as, e.g., a Professional Golf Association (PGA) Tour Event, or an industry convention, or a competition that may be exclusive to professionals or amateurs or may be opened to the public, or a promotional event at a driving range or golf course. The cryptographic digital asset may be provided with mutable properties, such as, e.g., attributes or characteristics or categories, that are included within the metadata of the cryptographic asset and modifiable only by authorized entities. In some embodiments, the authorized entity is the creator or author of the cryptographic digital asset. In some embodiments, the authorized entity is any user or entity having possession of a ModToken that can include an alphanumeric code or segment of code. The ModToken may be unlocked or accessed in a variety of ways, such as, e.g., by accomplishment of certain behaviors or performances, purchases, satisfaction of certain conditions, and the like. The ModToken may be separated or divided among parties, e.g., users and manufacturers, for assembly thereafter by one or more authorized entities. The cryptographic digital asset, and the metadata thereof, may be updated or modified by the authorized entity, having the ModToken, to include data associated with the event, or data associated with the user, or data associated with a physical or digital product, among other data.

In some embodiments, the data associated with the event may include conditions or occurrences, such as, e.g., performance data associated with an individual or a team playing golf at or during an event. In some examples, the conditions or occurrences may include a location of a golf ball hit by a player, a type of golf club used by a player, a player's score from playing a round or a hole, or parameters associated with a player's shot, e.g., a club head speed, ball speed, impact location, and the like. In some embodiments, the conditions or occurrences may include data associated with attendance and event operations, such as, e.g., weather, topology and dimensions of the golf course, number of attendees, number of attendees at certain places or certain times, advertisement locations and visibility, merchandise sales and usage, player winnings, etc. Further, event data associated with attendance may include, e.g., total number of broadcast viewers, number of broadcast viewers by type of broadcast, such types including cable networks or streaming services or social medial platforms, interactivity associated with viewership, such as selection of advertisements, selection of a broadcast specific to particular golfers or teams, or results from in-broadcast surveys, or the like. The data associated with the event, including performance data and event data, may be virtual or non-virtual, i.e., real, conditions or occurrences. In some instances, the event may be a virtual event.

In some embodiments, the data associated with the user may include physical attributes, e.g., height, weight, arm length, and the like, or preferences, e.g., right hand or left hand dominance, or performance parameters, e.g., swing speed, club head location control, or other data associated with a golf club or a game of golf.

In some embodiments, the data associated with a physical or digital product includes, e.g., data associated with a golf club. In some examples, the data associated with the golf club includes club type, club length, shaft stiffness, club head weight, loft and lie angles, neck and/or hosel configurations, club head and/or shaft materials, grip materials or thicknesses, sensors or sensor placement, markings or indicia, color, aerodynamics, COR, MOI, manufacturing method, and price, among others.

FIG. 1 illustrates an example system 100 for generating an NFT corresponding to a paired digital and physical ticket to a golf event, e.g., a tournament or competition, in accordance with some embodiments of the disclosed subject matter. As shown in FIG. 1, the system may include one or more computing devices or user devices 110, one or more servers 120, and one or more servers 140. The digital ticket may include a ticket number or ticket ID, a barcode or QR code or other machine-readable code, details about the access granted by the ticket, and event-specific details. The physical ticket may also include a ticket number or ticket ID, a barcode or QR code or other machine-readable code, details about the access granted by the ticket, and event-specific details, as well as a stub for removal upon entrance to the event.

Still referring to FIG. 1, the one or more computing devices 110 can receive data corresponding to one or more digital tickets. Additionally, or alternatively, the one or more computing devices 110 can receive input data from a user that correspond to attributes of one or more digital tickets. The one or more computing devices 110 can execute at least a portion of the system 100 to generate one or more NFTs corresponding to the one or more digital tickets. Additionally, or alternatively, the one or more computing devices 110 can communicate data corresponding to the one or more digital tickets to one or more servers 120 and/or one or more servers 140 over one or more communication networks or connections 130.

The one or more servers 120 can execute at least a portion of the system 100. In such embodiments, the one or more servers 120 can receive data corresponding to one or more digital tickets. Additionally, or alternatively, the one or more servers 120 can receive input from a user that correspond to attributes of one or more digital tickets. The one or more servers 120 can execute at least a portion of the system 100 to generate one or more NFTs corresponding to the one or more digital tickets. Further, information about digital assets secured by one or more NFTs can be stored on the servers 140.

Figure 2:
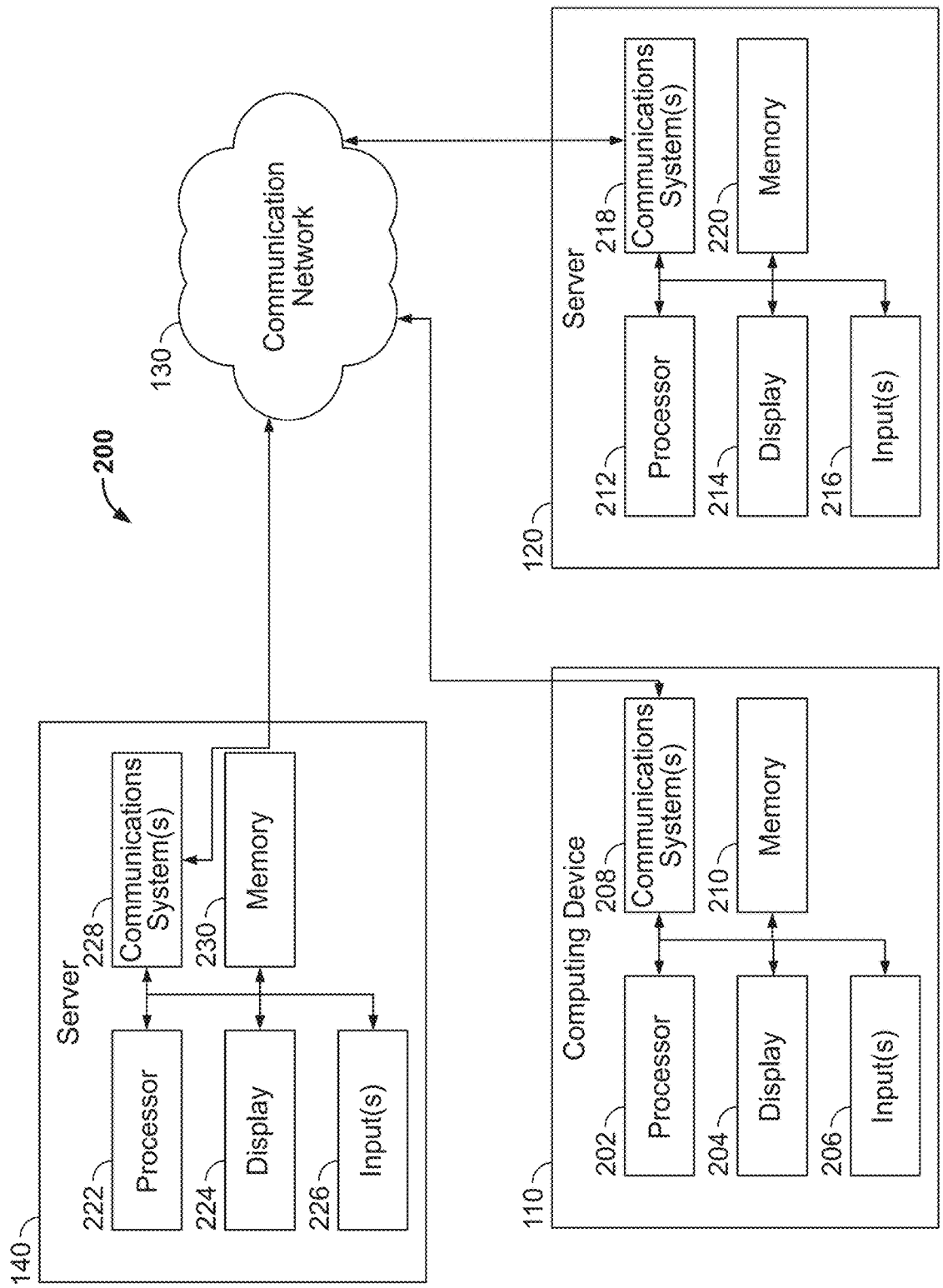
FIG. 2 depicts an example of hardware that can be used to implement a computing device and a server, shown in FIG. 1 in accordance with some embodiments of the disclosed subject matter.

FIG. 2 shows an example of hardware 200 that can be used to implement computing device 110 and/or the servers 120 and the servers 140 in accordance with some embodiments of the disclosed subject matter. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, display 204 can include any suitable display device, such as a computer monitor, a touchscreen, a television, etc. In some embodiments, inputs 206 can include any suitable input devices and/or sensors that can be used to receive user input, such as a keyboard, a mouse, a touchscreen, a microphone, a camera, etc.

In some embodiments, communications systems 208 can include any suitable hardware, firmware, and/or software for communicating information over communication network 130 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to generate an NFT, to present a digital asset using display 204, to communicate with server 120 via communications system(s) 208. Memory 210 can include any suitable volatile memory, non-volatile memory, storage, or any suitable combination thereof. For example, memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 210 can have encoded thereon a computer program for controlling operation of computing device 110. For example, in such embodiments, processor 202 can execute at least a portion of the computer program to receive inputs from a graphical user interface for customizing a golf club, store in memory an image of a digital asset based on the user's customizations, generate an NFT based on the digital asset, and mint the NFT to a blockchain network made up of computing devices 110 and/or servers 120. As another example, processor 202 can execute at least a portion of the computer program to implement the system 100 for generating an NFT corresponding to a paired digital and physical ticket. As yet another example, processor 202 can execute at least a portion of process 500, 700, and 1000 described below in connection with FIGS. 5, 7, and 10.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, a GPU, an ASIC, an FPGA, etc. In some embodiments, display 214 can include any suitable display device, such as a computer monitor, a touchscreen, a television, etc. In some embodiments, inputs 216 can include any suitable input devices and/or sensors that can be used to receive user input, such as a keyboard, a mouse, a touchscreen, a microphone, a camera, etc.

In some embodiments, communications systems 218 can include any suitable hardware, firmware, and/or software for communicating information over communication network 130 and/or any other suitable communication networks. For example, communication systems 218 can include one or more transceivers, one or more communication chips and/or chip sets, etc. In a more particular example, communication systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. For example, in such embodiments, processor 212 can execute at least a portion of the server program to receive inputs from a GUI for customizing a golf club or set, store in memory (e.g., memory 220) an image of a digital asset based on the user's customization, generate an NFT based on the digital asset, and/or mint the NFT to a blockchain network made up of computing devices 110 and/or servers 120. As another example, processor 212 can execute at least a portion of the server program, which can be a smart contract. to implement the system 100 for generating an NFT corresponding to a paired digital and physical ticket. As yet another example, processor 202 can execute at least a portion of process 500, 700, and 1000 described below in connection with FIGS. 5, 7, and 10.

In some embodiments, the server 140 can include a processor 222, a display 224, one or more inputs 226, one or more communications systems 228, and/or memory 230. In some embodiments, the processor 222 can be any suitable hardware processor or combination of processors, such as a CPU, a GPU, an ASIC, an FPGA, etc. In some embodiments, the display 224 can include any suitable display device, such as a computer monitor, a touchscreen, a television, etc. In some embodiments, the inputs 226 can include any suitable input devices and/or sensors that can be used to receive user input, such as a keyboard, a mouse, a touchscreen, a microphone, a camera, etc.

In some embodiments, the communications systems 228 can include any suitable hardware, firmware, and/or software for communicating information over the communication network 130 and/or any other suitable communication networks. For example, the communications systems 228 can include one or more transceivers, one or more communication chips and/or chip sets, etc. In a more particular example, the communications systems 228 can include hardware, firmware and/or software that can be used to establish a Wi-Fi connection, a Bluetooth connection, a cellular connection, an Ethernet connection, etc.

In some embodiments, the memory 230 can include any suitable storage device or devices that can be used to store instructions, values, etc., that can be used, for example, by the processor 222 to present content using the display 224, to communicate with one or more computing devices 110, etc. The memory 230 can include any suitable volatile memory, non-volatile memory, storage, or any suitable combination thereof. For example, the memory 230 can include RAM, ROM, EEPROM, one or more flash drives, one or more hard disks, one or more solid state drives, one or more optical drives, etc. In some embodiments, the memory 230 can have encoded thereon a server program for controlling operation of server 140. For example, in such embodiments, the processor 222 can execute at least a portion of the server program to receive inputs from a GUI for customizing a golf club or set, store in memory (e.g., memory 230) an image of a digital asset based on the user's customization, generate an NFT based on the digital asset, and/or mint the NFT to a blockchain network made up of the computing devices 110 and/or the servers 120, 140. As another example, the processor 222 can execute at least a portion of the server program to implement the system 100 for generating an NFT corresponding to a paired digital and physical golf club. As yet another example, the processor 222 can execute at least a portion of process 500, 700, and 1000 described below in connection with FIGS. 5, 7, and 9.

Figure 3:
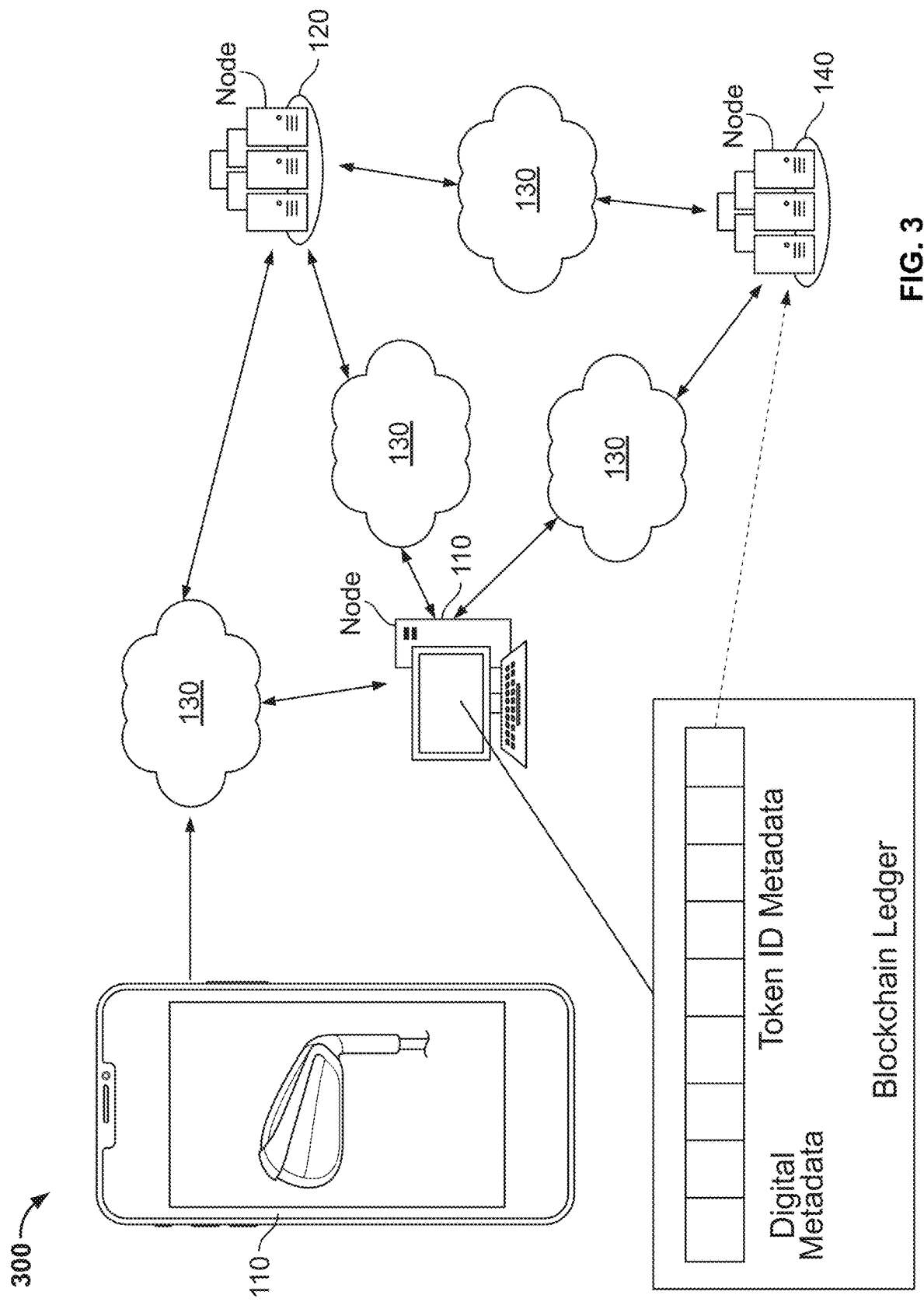
FIG. 3 depicts a schematic representation of an example blockchain network according to some embodiments of the present disclosure.

FIG. 3 illustrates an example blockchain network 300 according to some embodiments of the present disclosure. The blockchain network 300 may include one or more blockchain nodes. The blockchain nodes may each be a computing device 110 (e.g., similar to computing device 110 of FIGS. 1 and 2), and a server 120 (e.g., similar to server 120 of FIGS. 1 and 2) that are in communication with one another (e.g., via a communication network similar to the communication network 130 of FIGS. 1 and 2). A GolfNFT may be stored in a blockchain ledger stored on one or more of the blockchain nodes, e.g., "minted" into the blockchain ledger stored in the blockchain network, and thereby stored in memory of one or more of the blockchain nodes. For example, metadata of the GolfNFT may be stored in memory on a local computing device (e.g., computing device 110), and may be copied into the memory of one or more blockchain nodes, e.g., servers, such as server 120, and/or computing devices that may be similar to computing device 110. The one or more blockchain nodes may be responsible for storing data that is contained in the blockchain ledger. Each of the one or more blockchain nodes may store (e.g., in memory, such as, memory 210 or 220) a copy of the blockchain ledger, e.g., a deed tracking various transactions of, and modifications to, a GolfNFT securing a digital asset, such as a digital golf club.

The information of an NFT stored in the blockchain may be minimal, as there may be a cost associated with storing information on the blockchain. Therefore, metadata of the digital asset, and the digital asset itself can be stored in a memory (e.g., memory 230) or storage of the one or more servers 140. A URI can be stored with the NFT on the nodes 110, 120, and can include an address of the digital asset stored on the one or more servers 140, so that information about the digital asset can be obtained from the URI stored in the NFT, and the users of the blockchain network do not pay a disproportionate price for storing digital assets on the blockchain network.

The one or more blockchain nodes may each be a computing device located at one or more geographic locations, thereby creating a decentralized computing architecture. The blockchain network may be a public network (e.g., available to any user), or a private network (e.g., available to a specific set of users). For example, an organization may develop an application for storing NFTs corresponding to both digital and physical products, e.g., tickets, golf clubs, golf club sets, golf bags, articles of footwear, or articles of apparel. The application may be a mobile application, or desktop application, or web-based applet, comprising computer-readable instructions stored in, for example, memory 210 or 220, and configured to be executed by, for example, processor 202 or 212 (see FIG. 2). Any user who downloads the application onto a computing device, may then add their computing device to the blockchain network as a blockchain node. In some embodiments, the blockchain network may be private and, thus, limited to users who download the organization's application and obtain authorization to participate. If the application is available to the public, then the blockchain network may be a public network. However, if the organization restricts who has access to the application, or restricts authorization for select individuals who download the application from becoming a blockchain node, then the blockchain network may be a private network, such as e.g., a permissioned network. Generally speaking, the permissioned network is a distributed ledger that is not publicly accessible and can only be accessed by users with certain permissions, and the users can only perform specific actions granted to them by the central owner or the ledger administrators and are required to identify themselves through certificates or other digital means. In some embodiments, the blockchain network may be a known blockchain network (e.g., Bitcoin, Ethereum, or the like), and the permissioned network may be a sub-set or service associated with a known blockchain network.

The blockchain network may be an open, yet encrypted peer-to-peer network in which asset transaction records are linked via cryptographic hash functions in a distributed, immutable ledger of interconnected blocks. Each blockchain node may contain a ledger of blocks that includes one or more digital asset transactions accompanied by corroboration information representing a validity of each transaction as assessed by peer-validation devices, e.g., the other blockchain nodes in the blockchain network. Encrypted, decentralized computing architectures allow for authentication of transacted assets while preventing duplication of ownership of a cryptography-protected ("cryptographic") digital asset registered to the blockchain network. Decentralized asset management may work by encrypting a proprietary asset file, breaking the encrypted code into segments, and sending the segments to numerous different blockchain nodes, e.g., the blockchain nodes of FIG. 3, in the blockchain network. A validated owner may be provided with a private key that indicates where in the network the digital asset is located and how to reassemble or "decrypt" the file. For use as a distributed ledger, an individual blockchain may be managed by a host administrator and distributed to multiple peers collectively adhering to a protocol for inter-node communication and transaction validation.

The GolfNFT may be stored in the blockchain network, and may represent ownership of a specific digital asset. The GolfNFT may include, or may reference metadata corresponding to a digital ticket, e.g., a 2D representation or a 3D representation of an object that is part of or comprises a ticket, and the ticket ID. The ticket ID may be a 32-bit, 64-bit, or 128-bit alphanumeric code that is sectioned into individual segments. For example, the alphanumeric code may be sectioned into 2 segments, 4 segments, 8 segments, 16 segments, or 32 segments. The GolfNFT can include a URI specifying a location where metadata of the digital asset can be located. The metadata provided at the web address specified, which may correspond to the one or more of the code segments, can serve a list of attributes between the digital ticket and an event, moment, experience, or article corresponding to the digital ticket. The metadata provided at the web address specified can serve a list of attributes of the digital asset in JSON format that is provided in accordance with contemporary and relevant standards, such as, e.g., an Ethereum Request for Comments (ERC) 721 (Non-Fungible Token Standard) or ERC1155 (Multi Token Standard), among other relevant standards and as appropriate for the particular blockchain network and applications used therewith. This metadata can be stored on the one or more servers 140, which can be controlled by the manufacturer or the retailer, or could alternatively be stored in other servers or computing systems, such as cloud-based hosting servers, for example. Additionally or alternatively, the one or more code segments may correspond to attributes of the event, moment, experience, or article, or solely the digital ticket.

In some embodiments, metadata of a golf club can be stored on the servers 140 that are generally similar to servers 120, but are not part of the blockchain network. For example, in some embodiments, it can be advantageous to include attributes of a golf club in a NFT that could not be encoded in a 32-bit, 64-bit, or 128-bit code. An attribute club, for example, could have a custom design that does not correlate to a designated value within the code in the NFT, and would therefore need to be specified outside of the code. A cost of storing this information on a blockchain node can further be prohibitive to including additional information about an attribute golf club, which can in turn increase a cost of the NFT and impose practical limitations on the amount and structure of the data stored in an NFT. Further, third-party applications may require attributes of an NFT to be differently formatted to read and interpret the attributes of an NFT. An NFT marketplace, for example, can expect information of an NFT to be in JSON format or XML format in order to accurately represent information about the NFT, in accordance with the ERC 721 and/or the ERC 1155 standards. Thus, in some embodiments, metadata of the attribute golf club can be stored on nodes that are not themselves blockchain nodes. This metadata can, for example, be in JSON format and can provide an unlimited number of attributes of a golf club in custom fields of the JSON object.

The JSON payload can be accessible at a web address, e.g., a URL endpoint, that is hosted remotely and the endpoint can be provided in the body of the NFT as a URI, according to the ERC 721 and ERC 1155 standards. Thus, third-party applications, e.g., third-party integration 420 in FIG. 4, such as video games or online NFT marketplaces could read the URI from the body of the NFT, and access the remote, off-chain web address specified in the URI to obtain information about the attribute golf club. The computing nodes used to store metadata of an attribute golf club could be hosted by the provider of the NFT, and can be updated by the provider, or could be hosted on a third-party NFT hosting service in the cloud, which could, for example, ensure immutability of the NFT.

In some examples, the metadata provided at the URI address specified in the NFT and hosted on the servers 140 can correspond to one or more attributes associated with an event, including an event location, data associated with an event, or a level of access or priority provided by a ticket, or attributes associated with the manufacture or design of a physical article, including a golf club type, golf club handing (i.e., left hand or right hand orientation), golf club size, golf club fit, golf club color, golf club model, location of manufacture, date of manufacture, method of manufacture, or date of purchase. Additional combinations of the above-listed attributes should be recognized by those of ordinary skill in the art.

The digital golf club type may comprise metadata corresponding to a putter, iron, fairway or wood, hybrid, or driver. The digital golf club handing may comprise metadata corresponding to left hand or right hand. The golf club size may comprise metadata corresponding to shaft length in U.S. Men's sizes. It should be understood that metadata may correspond to similar sizes in Women's sizes, children's sizes, unisex sizes, and shaft length measurements of foreign countries. The digital golf club model may comprise metadata corresponding to a subset or species of the type of golf club type. For example, the golf club model may comprise metadata corresponding to a 1-wood, 3-wood, 5-wood, 7-wood, and so on. The golf club model may comprise metadata corresponding to a 1-iron, 2-iron, 3-iron, 4-iron, 5-iron, 6-iron, 7-iron, 8-iron, 9-iron, pitching wedge, approach wedge, sand wedge, or a lob wedge. The golf club color segment may comprise metadata corresponding to Black, Gray, Brown, Blue, Green, Orange, Tan, Yellow, Red, White, Multi-Colored, or Pink. The golf club fit segment may comprise metadata corresponding to various fit and performance measurements.

One should appreciate that the disclosed systems and techniques provide many advantageous technical effects including construction and storage of a digital asset blockchain representing user-to-user transactions of virtual collectables. Further, the blockchain technology enables the creation of unique, yet fully transferrable digital assets that maintain value by way of the general inability to make lossless copies, unlike traditional, unsecured digital files.

Figure 4:
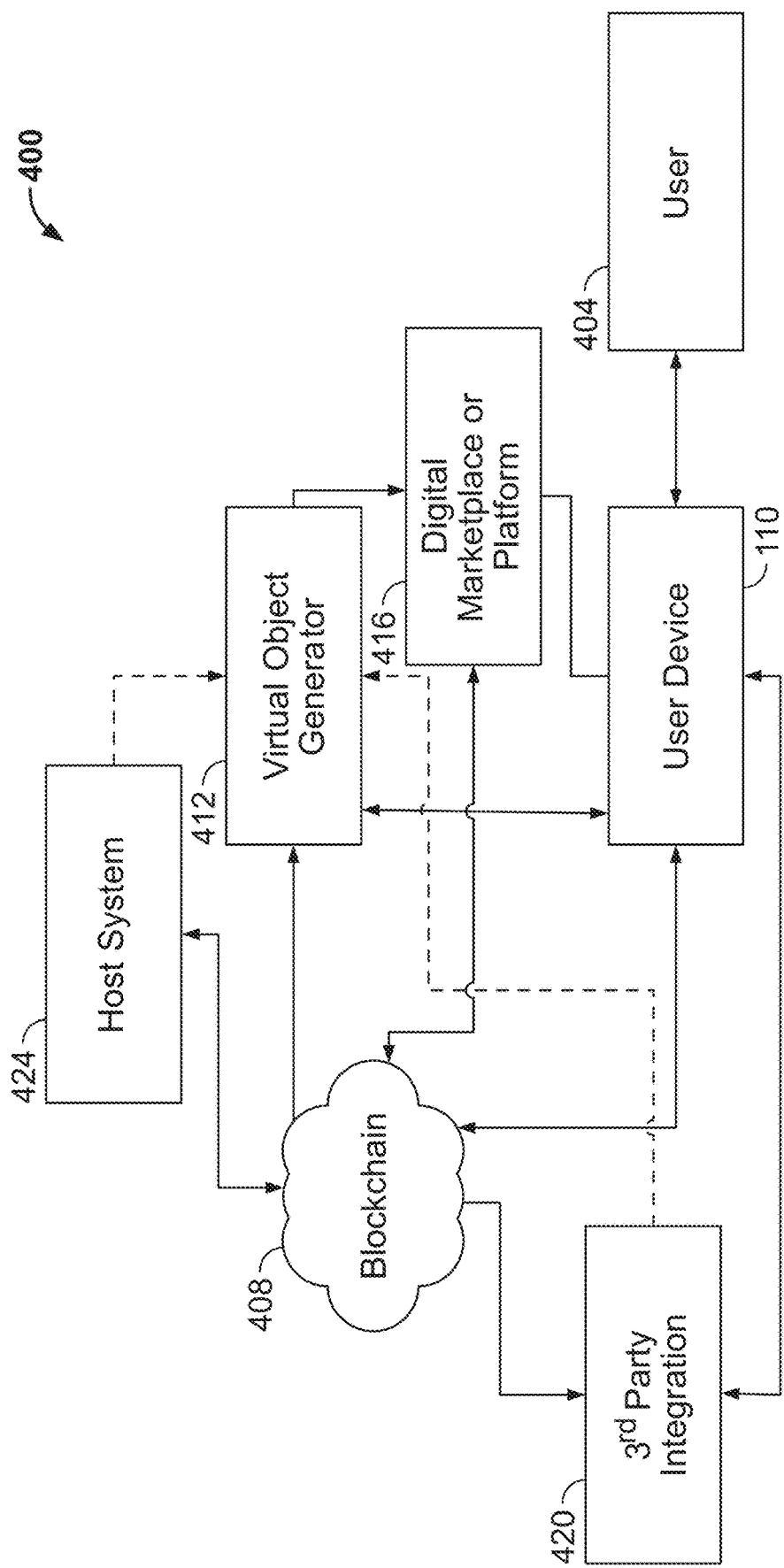
FIG. 4 depicts another schematic representation of an example blockchain network according to some embodiments of the present disclosure.

FIG. 4 provides a schematic representation of a functional structure of a decentralized computing system or blockchain network 400, similar to the blockchain network 300 of FIG. 3. As generally illustrated, a user 404 may operatively interface with the user device 110 that may include one or more of a smartphone, a tablet computer, a smart watch, a laptop computer, a desktop computer, a standalone video game console, smart footwear/apparel, or other similar internet enabled devices, e.g., a television, an exercise machine or device, or a vehicle, among other examples. The user device 110 may be operatively configured to communicate with one or more of an immutable public database (e.g., a blockchain service/network 408—referred to as "blockchain network 408"), a virtual object generator 412, an online digital marketplace or platform 416, and/or a third ($3^{rd}$) party integration service 420.

In general, the blockchain network 408 may include at least one NFT registered thereon that includes or references information representative of a digital asset. The user 404, via the user device 110, may be in possession of or may have a user wallet that includes a private cryptographic key that permits the user device to read the encrypted data associated with the NFT. This key may further enable the user 404 to freely transfer ownership of the NFT.

A virtual object generator 412 may be provided to create a virtual object associated with a digital asset. The virtual object generator 412 may employ a plurality of style and artistic rules such that the resultant digital objects are unique, yet recognizable according to predefined silhouettes, styles, articles, or characters. In some embodiments, the virtual object generator 412 may create the virtual object on the basis of auxiliary factors, such as the age of the asset, user activity (tracked via the user device), or use via third party platform. The virtual object generator 412 and/or blockchain network 408 may further be in communication with a hosted digital marketplace 416, forum, social platform, or the like. The digital marketplace 416 may represent a plurality of virtual objects in a manner that permits the organized trade and/or sale/purchase of the virtual objects between parties. Upon closing of the sale or transfer, the digital marketplace 416 may update the blockchain network 408 with the new ownership information and facilitate the transfer of new or existing keys to the new asset holder. In some embodiments, the digital marketplace 416 may further enable various social engagement functions, such as voting or commenting on the represented virtual objects. Likewise, in some instances the digital marketplace 416 may be configured to assess and score the scarcity of a particular virtual object based on the sum total of the object's expressed features or characteristics, as well as consideration of any of the auxiliary factors. Such a scarcity score may then enable the marketplace (and/or users who participate within the marketplace) to better assess the value of the object.

Further, the system 400 may further include a 3rd party integration service 420 that may enable the use of the virtual object in different contexts or manners. The 3rd party integration service 420 may operate as an API on an app provided on the user's device, or as a dedicated cloud based service. In some embodiments, the 3rd party integration service 420 may make the virtual object, e.g., as expressed by the virtual object generator 412, and/or the information available for external use. Examples of such a use may include skins on 3rd party video game characters, objects capable of being used by 3rd party video game characters, digital artwork displays, physical 2D print generation, manufacturing production, such as, e.g., 3D print generation, and the like. In one embodiment, the information and/or scarcity score may be made available and may alter the characteristics or abilities of a user's video game character in a video game played on the user's device 110.

A corporate host system 424 may be in communication with the blockchain network 408 for the purpose of provisioning, initially creating new digital assets, and/or storing metadata therefor. Additionally, the host system 424 may provide one or more rules to the virtual object generator 412 to constrain the manner and style in which genomic information from the blockchain network 408 is expressed in a visual/artistic form.

Figure 5:
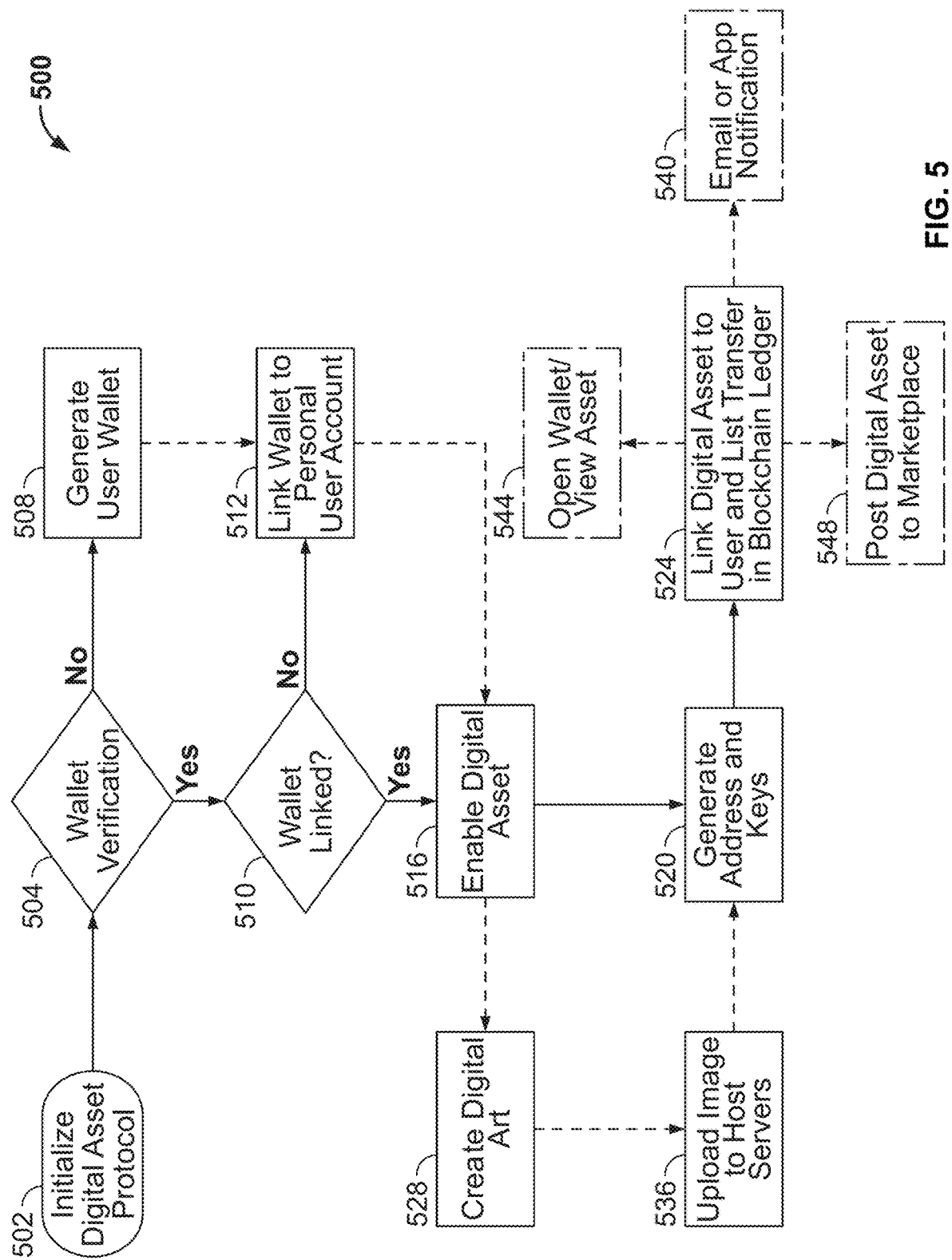
FIG. 5 depicts a flowchart for an example method of generating a digital asset protected by a non-fungible token according to some embodiments of the present disclosure.

With reference to FIG. 5, a method of generating a digital asset protected by NFTs on a blockchain ledger is generally described in accordance with aspects of the present disclosure. Some or all of the operations in FIG. 5 and described in further detail below may be representative of an algorithm that corresponds to processor-executable instructions that may be stored, for example, in main or auxiliary remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation block may be changed, additional blocks may be added, and some of the blocks described may be modified, combined, or eliminated.

The method 500 of FIG. 5 starts at terminal block 502 with processor-executable instructions for a programmable controller or control module or similarly suitable processor to call up an initialization procedure for a protocol to generate a cryptographic digital asset, such as a computer-generated digital golf club and encrypted token key, for a consumer product. This routine may be called-up and executed in real-time, continuously, systematically, sporadically, and/or at regular intervals. As a representative implementation of the methodology set forth in FIG. 5, the initialization procedure at block 502 may automatically commence each time an authentic golf club is manufactured, at various stages of the supply chain and manufacturing process, each time a user 404 purchases a real-world golf club or a ticket to an event or a cryptographic digital asset, or each time the user 404 unlocks an access key. Alternatively, the initialization procedure may be manually activated by an employee at a POS terminal or by the manufacturer.

Other initialization procedures may be initiated for different digital assets, which may represent assets other than golf clubs. For example, a digital asset could represent a proof of attendance at a given event. Accordingly, the digital asset could be instantiated upon a confirmation of attendance at an event. Alternatively, a limited number of proof of attendance NFTs may be minted for an event, and those NFTs may be earned by attendees on a first-come first-serve basis, or attendees could earn the remaining NFTs by scanning a QR code, for example. Digital assets can correspond to utility NFTs, which can provide a functionality to the owner. For example, a digital asset can entitle the owner to access to benefits or exclusive content, e.g., as discussed further below and with respect to FIG. 6.

Using a user device 110, such as, e.g., a portable electronic device, including a smartphone, or other electronic device, the user 404 may launch a dedicated mobile software application (app) or web-based applet that collaborates with a server-class (backend or middleware) computer (e.g., a remote host system) to communicate with the various peer devices on the decentralized computing system 400. During a communication session with, e.g., the host system 424, the user 404 may purchase a golf club using a corresponding feature provisioned by the app. The user 404 enters the personal information and a method of payment to complete the transaction. Upon completion of a validated payment, the host system 424 receives, e.g., from an online store transaction module or an approved third-party electronic payment system, a transaction confirmation to indicate a validated transfer of the golf club to the user 404 has been completed. As indicated above, validated transfer of the golf club may be effectuated through any available means, including at a brick-and-mortar store, through an online auction website, an aftermarket consumer-to-consumer trade/sale, etc. In other embodiments, the user 404 may perform other transactions, or purchase other products. For example, the user 404 may purchase a digital asset represented by an NFT directly or may purchase a product other than a golf club, which may have a digital asset associated therewith (e.g., a golf bag). A user 404 may receive an NFT representing ownership of a digital asset without performing a transaction, for example, by earning the NFT through attendance at an event, or performance in an event, or by logging in to a platform or marketplace at predetermined times.

Next, the method 500 proceeds to decision block 504 to determine if the user 404 has procured a cryptocurrency user wallet, also referred to herein as a cryptocurrency wallet or digital wallet or user wallet, or other similarly suitable digital blockchain account that is operable, for example, to upload and maintain location and retrieval information for digital assets that are encrypted and stored in a decentralized manner. A cryptocurrency wallet typically stores public and private key pairs, but does not store the cryptocurrency or token itself; the cryptocurrency or token is decentrally stored and maintained in a publicly available blockchain ledger. With the stored keys, the owner may digitally sign a transaction and write it to the blockchain ledger. A platform-dictated smart contract associated with the wallet may facilitate transfer of stored assets and create a verifiable audit trail of the same. If the user 404 has not already acquired a digital blockchain wallet, the method 500 continues to predefined process block 508 to set up a wallet. By way of non-limiting example, user 404 may be prompted to visit or may be automatically routed to any of an assortment of publicly available websites that offer a hardware wallet for cold storage of cryptocurrency such as an ERC20-compatible Ethereum wallet provided by MyEtherWallet, or Metamask, among other viable sources or providers.

Once the system confirms that the user 404 has a suitable digital blockchain wallet at process block 504, the method 500 may check if the wallet is linked to a personal user account at decision block 510. In some instances, the user 404 may have already linked a wallet to a user account in a prior transaction and thus, the method 500 could proceed to process block 516. Where the user 404 has not linked their wallet, the method 500 may automatically link, or prompt the user 404 to link, the digital blockchain wallet to a personal user account, as portrayed at process block 512 of FIG. 5. This linking at process block 512 may proceed automatically if a wallet was generated at process block 508, without the need to perform a check at decision block 510 of whether the wallet has been linked. Linking a wallet to a personal account at process block 512 may require the remote host system 424 to retrieve a unique owner ID code associated with the purchasing party (e.g., user 404) from an encrypted relational database (e.g., provisioned through cloud computing system 130). At this time, a unique physical golf club ID code associated with the purchased golf club may be linked to the user's personal account.

Upon determining that the user 404 has acquired a digital blockchain wallet, i.e., block 504=YES, and that the wallet is linked to a personal user account, i.e., block 510=YES, or after linking the user's blockchain wallet to their personal user account at block 512, the method 500 continues to input/output block 516 to enable a cryptographic digital asset associated with the golf club. As indicated above, after purchasing the golf club, the universally recognized UPID product code may be used to retrieve a collectable golf club NFT which is identified by an encrypted token key, and is generally associated with a collectable digital golf club. In some embodiments, the UPID may be used to trigger a function of the golf club NFT, such as compensation for a third party, e.g., a fitter, associated with or identified by the metadata of the golf club NFT. A third-party or a retailer at a POS terminal or the user 404 employing their user device 110 may scan the UPID or UPC on the golf club or a box storing therein the golf club. Accordingly, enabling a cryptographic digital asset, at block 516, may be automatic, random, systematic, prize based, or performed in any logically appropriate manner.

After receiving confirmation that a cryptographic digital asset has been authorized at input/output block 516, the method 500 generates a cryptographic digital asset for the transacted golf club. This may comprise generating a unique, encrypted asset code with a contract address (i.e., the address where the smart contract is deployed on the blockchain network), a token, and a public and private key pair, as denoted at predefined process block 520. Host system 424 may transmit the token, with the public key and the owner ID, to a distributed blockchain ledger to record and peer-validate transfer of the cryptographic digital asset to the user 404 on a transaction block. The method 500 continues to process block 524 to link the cryptographic digital asset with the unique owner ID code. This control logic may comprise executable instructions for assigning the encrypted asset code to the user 404 and storing the public and private keys in the user's digital blockchain wallet. As illustrated in FIG. 5, once the digital asset has been linked to the user 404, as through transfer to the user of the NFT securing the digital asset, optional process block 540 may issue a digital notification, such as an email or push notification, to the user's smartphone 110, or other electronic device, with all related information for accessing, transferring and intermingling the cryptographic digital asset. Additionally or alternatively, the remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

With continuing reference to FIG. 5, in some embodiments, after a digital asset is enabled or initialized at block 516, the method 500 can proceed to process block 528 to produce a virtual representation or "digital art" of the cryptographic digital asset. The virtual representation may include a computer-generated avatar of the golf club or a limited-edition artist rendition of the golf club. It is also envisioned that one or more attributes of the virtual representation of the cryptographic digital asset may be created, in whole or in part, via the user 404. Alternatively, a machine learning function may be executed to generate image features through a neural network to product the digital art at process block 528. Upon completion of the digital art, the image may be uploaded to cloud computing system 130 at block 536, and the digital art can be included as part of the digital asset.

Generally, by incorporating metadata into the non-fungible token (NFT), or digital asset secured by the NFT, that corresponds to attributes of a physical golf club or a digital model for the manufacture of a physical golf club, the digital golf club corresponding to the NFT will be linked to the physical golf club. For example, the digital golf club may appear to be the same size, color, and material on a display screen (e.g., display screen of computing device 110) as a corresponding physical golf club. In some embodiments, the metadata includes reference to a UPID that corresponds to the physical code, or a version thereof, associated with the physical golf club, thereby linking the golf club NFT to the physical golf club in a one-to-one fashion. In some embodiments, the golf club NFT may be provided as a collection or family of golf club NFTs having, e.g., variations or permutations in attributes or appearance or underlying metadata, but with each golf club NFT in the collection being linked to the same physical golf club by way of reference to the UPID in the metadata. In this way, multiple golf club NFTs can be generated for a single model or edition of a physical golf club, and each golf club NFT can further represent a unique digital golf club. The golf club NFTs can, therefore, be a collection of two (2) or more, such as, e.g., a collection of 3, 4, 5, 6, 7, 8, 9, 10, 11, 12, or more, a collection of 20 or more, a collection of 50 or more, a collection of 100 or more, a collection of 250 or more, or a collection of 500 or more.

Generally speaking, when a cryptographic digital asset, secured by an NFT, is generated by a developer, e.g., an author or creator, the developer may write various restrictions into the smart contract of the NFT securing the cryptographic digital asset. In some instances, the developer may restrict access to metadata of the cryptographic digital asset, such that only certain portions of the metadata may be updated or modified by only certain users. For example, the developer may retain exclusive editable access to the metadata and permit view-only or read-only access of the metadata by subsequent owners or third-parties. In another example, the developer may permit subsequent owners or third-parties to have editable access to specific portions of the metadata. In still another example, the developer may allow subsequent owners to have editable access to the metadata and may provide third-parties with view-only or read-only access. The digital asset could thus have certain editable or mutable properties of the metadata. In some cases, an address referenced in an NFT could be an API endpoint that may vary an information returned to the user, or implement a function based on the HTTP method through which the API endpoint is accessed. The API endpoint could allow a user or system to perform a GET, HEAD, PUT, or POST, for example, which could allow a property of the digital asset to be changed based on the operation performed. Access to the API endpoint referenced in an NFT can be predicated on verification of ownership of the NFT. Those skilled in the art will appreciate that accessing, writing, and/or modifying the metadata of the cryptographic digital asset may be accomplished by, e.g., using a "getTokenUri" and/or a "setTokenUri" function, or equivalents thereof, in compliance with the relevant standard, e.g., ERC-721 or the like.

Figure 6:
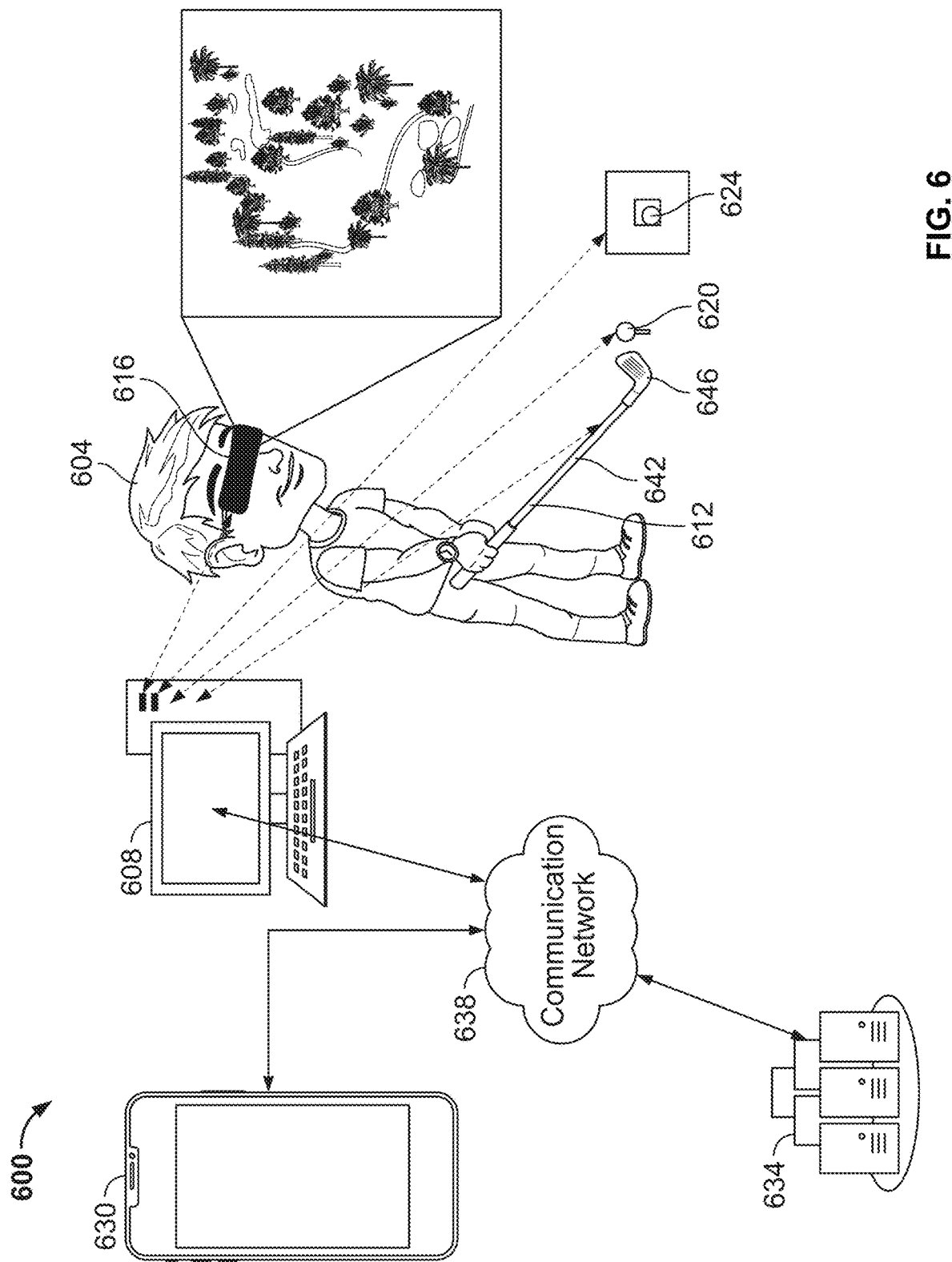
FIG. 6 depicts a schematic representation of an embodiment of a golf system.

Referring to FIG. 6, a golf system 600 is provided in association with cryptographic digital assets. The golf system 600 may be used to play golf on a physical, non-virtual golf course. In some embodiments, the golf system 600 may be used at a driving range, a country club, at a personal residence, in a professional or commercial retail store, in a booth or tent at an event or competition, or the like. The golf system 600 used by a user 604 includes a computing device 608 that is in communication with a golf club 612, a wearable electronic device 616, e.g., web-enabled eyewear that may include augmented reality (AR) or virtual reality (VR) functionalities, a golf ball 620, and a sensor 624. Further, a user device 630, which may be a smartphone, and a server 634 is in communication with the computing device 608 via a communication network 638. In the illustrated embodiment, the user 604 is holding the golf club 612 at address. As the user 604 plays golf, e.g., swings the golf club 612 to hit the golf ball 620 and travels to the location of the golf ball 620 on the golf course to then hit the golf ball 620 again, the golf system 600 is configured to collect data associated with an event, whether the event occurs entirely within the physical realm or in the physical realm and the virtual realm, or data associated with the user, or data associated with a physical or digital product, among other data. To that end, the sensor 624 is provided with the golf system 600. Further, sensors can be provided in the golf ball 620, the golf club 612, the wearable device 616, and the user device 630, all of which are in communication with the computing device.

The golf system 600 is provided for detecting, storing, and/or transferring information to the computing device 608. For example, the user 604 may swing the golf club 612 and contact, i.e., hit, the golf ball 620, which is commonly referred to as a shot. As mentioned previously, the golf club 612 may comprise various sensors, i.e., first sensors, that are configured to capture data from the swing and to send the data to the computing device. In some embodiments, the first sensors of the golf club 612 are configured to detect a swing speed, an impact location, an impact force or pressure, and a number of impacts or shots, among other data. The first sensor of the golf club 612 may be pre-programmed to include data related to the golf club type, the golf club make and model, a golf club ID, the golf club age, and the like. Accordingly, the golf club 612 may include one or more first sensors located within a shaft 642, a club head 646, or both, to capture data associated with pressure or force, strain or deformation, rotation, acceleration, velocity, and location, or some combination thereof, among other parameters.

Additionally or alternatively, the golf ball 620 may include a second sensor attached thereon or embedded therein. The second sensor of the golf ball 620 may be configured to detect a position of the golf ball 620 on a golf course, a shot starting location or launch position, a shot ending location or a landing position, a shot distance, a shot elevation, a shot speed, a shot angle or launch angle, a shot rotation, a number of shots, and the like. To that end, the second sensor of the golf ball 620 can capture data associated with pressure or force, strain or deformation, rotation, acceleration, velocity, location, and altitude, or some combination thereof, among other parameters. In addition, the second sensor of the golf ball 620 may be pre-programmed to include data related to the golf ball type, the golf ball make and model, a golf ball ID, the golf ball age, and the like.

Further, the wearable device 616 may include one or more third sensors to detect pressure or force, strain or deformation, rotation, acceleration velocity, location, and altitude, or some combination thereof, among other parameters. The wearable device 616 and the sensor 624 can provide additional data that is used to corroborate data captured by the golf club 612 and the golf ball 620, or the wearable device 616 and the sensor 624 may be used to supplement or substitute data captured by the golf club 612 and the golf ball 620. In some embodiments, the wearable device 616 is or communicates with the user device 630. In some embodiments, the user device 630 includes one of the sensors 624 of the golf system 600. The sensors, including the sensor 624 and the first, second, and third sensors, may capture, analyze, and transmit data to the computing device 608. It is contemplated that the first sensor may be removably and selectively attached to the golf club 612, the second sensor may be removably and selectively attached to the golf ball 620, and the third sensor may be removably and selectively attached to the wearable device 616, such that the user 604 can select different golf clubs and golf balls and wearable devices from, e.g., the user's golf bag, throughout a round of golf, while maintaining the enablement of data capture with any of the selected golf clubs and golf balls and wearable devices. Further, the wearable device 616 may include an on-board processor, e.g., a CPU, and a display screen for displaying virtual or graphical representations, such as, e.g., virtual representations of a golf course, the golf club 612, the golf ball 620, and the like. The wearable device 616 may be an augmented reality (AR) device or a virtual reality (VR) device. In some instances, the wearable device 616 may display weather updates, such as forecasted rain or wind velocities or high temperatures in the vicinity of the golf course or golfer.

The sensors discussed above, including the sensor 624 and the first, second, and third sensors, or any number of sensors, are provided for capturing data associated with the user 604, the golf club 612, the golf ball 620. It will be appreciated that several sensors of varying kinds and types can be employed in the golf system 600. For example, the sensors may include a camera, a video motion sensor, a light detection and ranging (LIDAR) sensor, an ultrasonic sensor, an area reflective sensor, a passive infrared sensor, or the like. Further, the sensor may be attached to or embedded within (and operably with other sensors in) the golf ball 620, the golf club 612, or the wearable device 616 to detect pressure or force, strain or deformation, rotation, acceleration velocity, location, and altitude, or some combination thereof, among other parameters. For example, the sensor may be a global positioning system (GPS) sensor, a load cell, a strain gauge, an accelerometer, a force sensing resistor (FSR), a receiver or transmitter or transceiver, or the like.

In some embodiments, the user device 630, e.g., the user's smartphone, runs the digital platform 416, e.g., a mobile app or web applet, that updates the metadata of the digital asset secured by the NFT automatically during use of the golf system 600. For example, swinging the golf club 612 to contact the golf ball 620 generates data associated with impact, shot distance, shot location, and swing speed, among others. The user device 630 may communicate with the sensors of the golf system 600, such as the sensors of the golf club 612 and golf ball 620, by wireless transmission, e.g., Bluetooth, Wi-Fi, satellite communication, infrared communication, radio waves, or the like. Accordingly, the digital platform 416 may operate the user device 630 to collect the data associated with use of the golf system 600 from the sensors of the golf club 612 and the golf ball 620. As the data is collected, it may be processed by the digital platform 416 and stored in memory on the user device 630 or transmitted to a server or computing device for storage in memory. Further, the digital platform 416 may use the data to update the metadata of the digital asset associated with or secured by the NFT that is linked to the user's digital wallet, as described in process 500. For example, various attributes of the digital asset may be updated to include the data associated with, e.g., the impact, shot distance, shot location, and swing speed. In some embodiments, the digital asset may be updated to include the data associated with the event, whether a real event in the physical realm or a virtual event, or some combination thereof. To that end, the digital platform 416 is authorized, whether by the developer or the user, to update the metadata of the digital asset associated with the NFT.

In some embodiments, the user device 630 and/or wearable device 616 is configured to recognize the golf club 612 and/or golf ball 620 of the golf system 600 to unlock permission to update the metadata of the NFT, or of the digital asset associated therewith. To that end, the digital platform 416 executes a program by which the golf system 600 can be recognized, e.g., the digital platform 416 sends a request for an ID, e.g., a UPID or UPC, of the golf club 612 or golf ball 620 or wearable device 616. After the digital platform 416 receives the ID, the ID is checked against the authorized ID(s) stored within memory of the user device 630, or on a server or computing device, to validate whether the ID matches an ID that corresponds to the NFT. If the IDs match, then the ID is recognized and the digital platform 416 use of the golf system 600 is permitted or authorized to update the metadata of the NFT or of the digital asset associated with the NFT.

In some embodiments, the user 604 can purchase the NFT from the digital marketplace or platform 416 separate from the purchase of a physical golf club or component of the golf system 600. For example, the Brand may offer a limited series of NFTs that are available for purchase through the digital marketplace or platform 416, such that users can purchase one or more of the NFTs. Next, users can purchase a physical golf club that includes a physical ID, e.g., a UPID or UPC, and may further include the sensors. The metadata of the NFT or of the digital asset associated with the NFT may be updated with the physical ID of the physical golf club to link the NFT to the physical golf club. In this way, the metadata of the NFT or associated digital asset may be updated based on data generated from use of the physical golf club having the physical ID.

Figure 7:
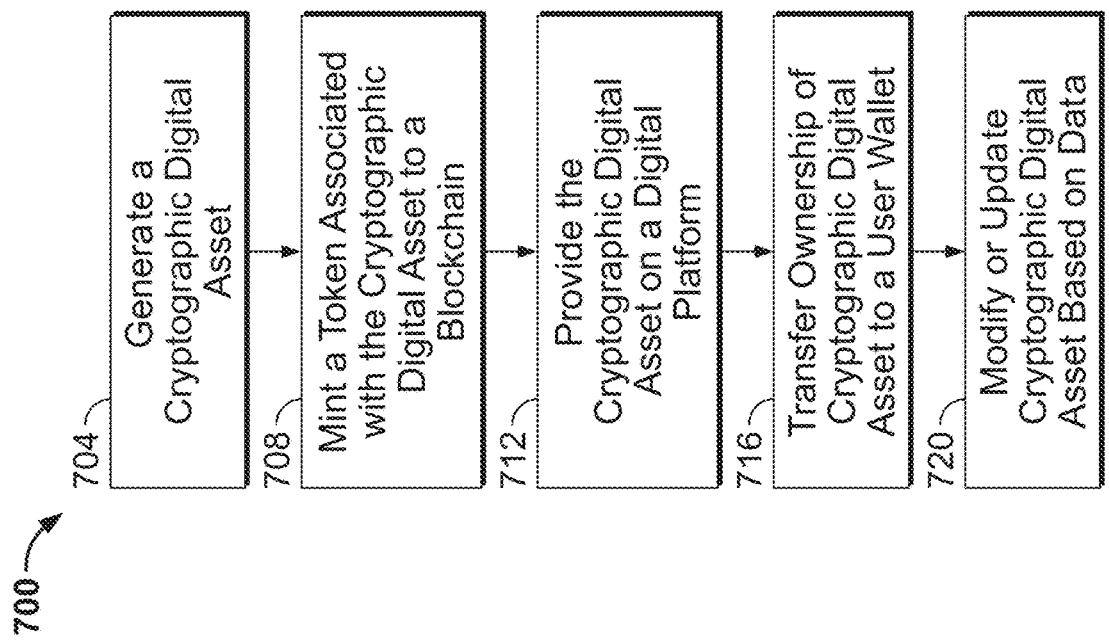
FIG. 7 depicts a flowchart for an example process of modifying or updating a non-fungible token.

FIG. 7 illustrates a flowchart of an example process 700 of modifying or updating an NFT. In Step 704, the Brand generates at least one cryptographic digital asset, that can be secured by an NFT. As previously discussed, the NFT can include some information or metadata, or could include a URI for a digital asset represented and secured by the NFT, the digital asset being stored off the blockchain. The digital asset can include a virtual object and metadata. In Step 708, the Brand mints the NFT associated with the digital asset to a blockchain network, such as the blockchain network 408. In some instances, the blockchain network is a public, permissionless network, such as Ethereum. In some embodiments, the blockchain network is a private network that is accessible only by authorized users and is hosted by a corporate host, such as the host system 424, which may be the Brand. In Step 712, the Brand provides the NFT on a digital platform or marketplace, such as the platform 416, where the NFT can be accessed and viewed, and where transactions involving the NFT may be conducted. For example, users on the digital platform may be able to purchase the NFT, trade or swap the NFT for NFTs securing other digital assets, spend the NFT in return for benefits or functions, and sell the NFT to the Brand or to other users. In Step 716, the digital platform operated by the Brand transfers ownership of the NFT to the user's digital wallet, which may be accomplished similar to the process 500 of FIG. 5. Further, Step 720 includes modifying or updating the digital asset associated with the NFT based on data associated with events, users, products, or the like. In some embodiments, the data is associated with real activities or non-virtual conditions and events. Accordingly, the digital asset associated with the NFT is configured to be modified or updated by, e.g., the user, the Brand, or other authorized parties. In some instances, the digital asset can be updated or modified automatically, without the user's awareness or initiation. In some instances, the digital asset can only be modified after approval is provided by the user or Brand. It is to be understood that modifying the NFT may not include modifying the NFT directly and can instead include updating the metadata of the digital asset referenced in the URI of the NFT.

It is to be understood that modifying or updating an NFT, as described herein, includes modifying or updating the digital asset or virtual object associated with the NFT. Thus, updating the NFT may not include altering a property of the NFT itself, but may instead include adding, removing, or modifying metadata of the virtual object or digital asset associated off-chain. Therefore, any reference to updates to the NFT should be understood to include both direct modifications of the NFT, and modifications of the digital asset.

The Brand may offer various NFTs having different levels or degrees of mutability or modification and that afford various functionalities and benefits. In some embodiments, the Brand may generate a first level of NFTs that have only a single modifiable attribute or setting. A second level of NFTs can be configured to allow for modification of multiple predetermined settings or attributes included in the metadata. In some embodiments, the predetermined settings or attributes can be updated based on various conditions or events, such as, e.g., a shot location of a golf ball on a golf course.

Figure 8:
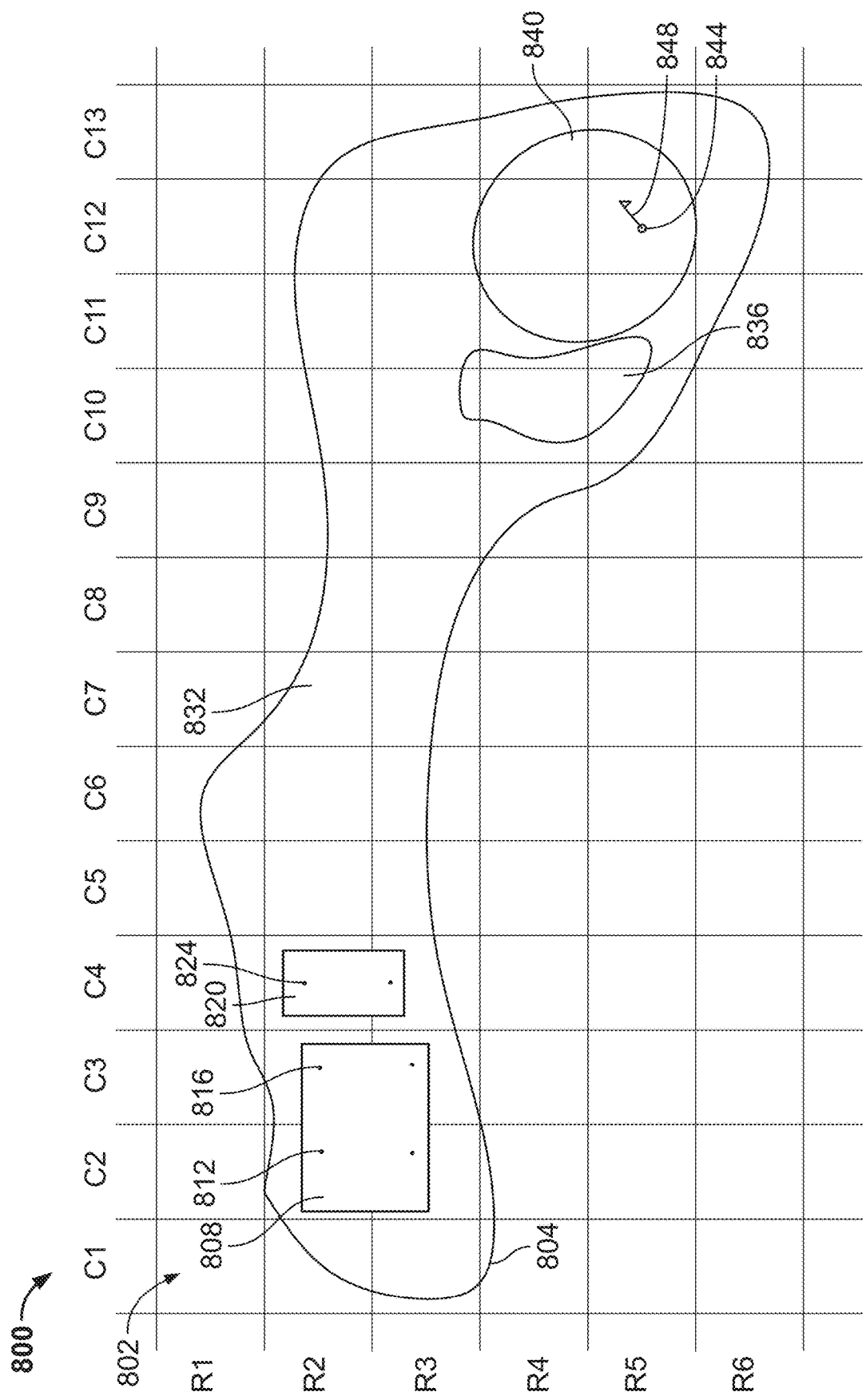
FIG. 8 depicts a grid system, according to an embodiment of the present disclosure.

The NFT may represent digital ownership of a digital asset including a virtual object that may be created or commissioned to be created by the Brand. In some embodiments, the digital asset represented by the NFT may include metadata that corresponds to a grid system 800 comprising a plurality of parcels 802 overlaid on a golf course 804, as illustrated in FIG. 8. In such embodiments, the grid system 800 may be any organizational framework for defining the plurality of parcels 802 across the golf course 804. The grid system 800 of the illustrated embodiment includes rows R1, R2, R3, R4, R5, R6 divided by an array of horizontally extending, parallel lines that are spaced apart from one another and columns C1, C2, C3, C4, C5, C6, C7, C8, C9, C10, C11, C12, and C13 divided by an array of vertically extending, parallel lines that are spaced apart from one another. In the illustrated embodiment, the vertical, parallel lines are orthogonal to the horizontal, parallel lines, such that the rows and columns define rectangular-shaped parcels 802. The golf course 804 may include features typical of most golf courses, including a first tee box 808 having a first set of tee markers 812 and a second set of tee markers 816, a second tee box 820 having a third set of tee markers 824, a fairway 832, an obstacle 836, a putting green 840, a hole 844, and a flag 848. The golf course 804 may be a physical, real-world golf course, such as, e.g., the Augusta National® Golf Club or Pebble Beach® Golf Club, or the like. It will be appreciated that the golf course 804 may include other features, such as water hazards, rough areas, cart paths, shelters, pumping stations, or the like. Further, the golf course 804 may have more than two tee boxes 808, 820 or more than one obstacle 836. In addition, the golf course 804 may be sized, shaped, or arranged differently than shown.

In the illustrated embodiment, the grid system 800 overlaid on the golf course 804 forms the plurality of parcels 802 designated by the corresponding rows and columns as "parcel R #, C #." For example, the first tee box 808 occupies parcel C2, R2, parcel C3, R2, parcel C2, R3, and parcel C3, R3. Further, the second tee box 820 occupies parcel C4, R2 and parcel C4, R4. It will be appreciated that every feature and location of the of the golf course 804 occupies one or more parcels 802 of the grid system 800. The grid system 800 is design to form equally sized parcels 802, such that every parcel 802 has the same dimensions. In some embodiments, the parcels 802 are squares having equal length and width dimensions. For example, each parcel 802 may define a one (1) meter by one (1) meter square. In some embodiments, the parcels 802 are rectangles having length dimensions that are greater or less than their respective width dimensions. For example, each parcel 802 may define a length of one (1) meter and a width of two (2) meters. The parcels 802 may be any suitable size. The grid system 800 may be overlaid on the golf course 804 and visualized through a program running on a server, a user device, a computing device, or the like.

It is contemplated that users may view the grid system 800, their location thereon, and the location of the user's golf ball 620 in real-time during a round of play on the golf course 804. To that end, the position of the users on the golf course 804 may be tracked by a sensor, e.g., a GPS sensor, in the user device 630, or mounted to the golf club 612, or the wearable device 616, or in an article of clothing or footwear. Further, the position of the user's golf ball 620 may be tracked by another sensor, e.g., a GPS sensor, embedded in the golf ball 620. Further, the users may view the grid system 800 and the location of other users or players and their golf balls in real-time during a round of play on the golf course 804. To that end, the wearable device 616 may be configured to display a virtual representation of the golf course 804 with the grid system 800 overlaid thereon.

In some embodiments, the user may purchase an NFT corresponding to a parcel 802, such as, e.g., the parcel C12, R4. As a round or multiple rounds of golf are played on the golf course 804, activity occurring within the parcel C12, R4 may be recorded by the sensor in the golf ball 620, the sensor on or carried by the user or other players, the sensor in the golf club 612, and the like. The sensors may be in communication with the digital platform 416 where a dataset is maintained to log all of the activity occurring on the grid system 800 of the golf course 804. That is, when a player hits the golf ball 620 and the shot comes to rest within, e.g., parcel C12, R4, the dataset of the digital platform 416 is updated to record that activity. Further, the digital platform 416 is in communication with the user's NFT corresponding to the parcel C12, R4, such that the activity associated with such parcel is updated in the metadata of the virtual object or digital asset associated with the NFT. To that end, the metadata of the NFT includes a non-editable or immutable attribute that specifies the particular parcel it corresponds to and an editable or mutable attribute that can be updated with data regarding activity occurring within the specified parcel. Accordingly, if the activity takes place within another parcel not specified in the metadata, no update is performed; if the activity takes place within the specified parcel, then the editable attribute is updated. Further, the editable attribute may be updated to include a certain value, such as, e.g., a numerical value, which may have statistical scarcity or popularity in comparison with a collection of NFTs linked to each parcel 802. That is, each parcel 802 may be linked to a unique NFT of a collection of NFTs, such that there is a one-to-one matchup between the NFTs and the parcels 802. The editable value may range from rare to popular, with rare meaning that a low statistical quantity of the NFTs have the same editable value and popular meaning a high statistical quantity of NFTs include the same editable value. A low statistical quantity may be less than 50% of NFTs have the same editable value, or less than 40%, or less than 30%, or less than 25%, or less than 20%, or less than 15%, or less than 10%, or less than 5%. A high statistical quantity may be more than 50% of NFTs have the same editable value, or more than 60%, or more than 70%, or more than 75%, or more than 80%, or more than 85%, or more than 90%, or more than 95%. In some instances, a statistical quantity of 50% is considered average and neither rare nor popular.

In some embodiments, the digital platform 416 maintains the dataset throughout rounds of play during a competition, such as a PGA Tour event, and the digital assets associated with the NFTs are updated at the conclusion of the competition. In some embodiments, the digital platform 416 updates or modifies the digital assets associated with NFTs intermittently at predetermined intervals throughout a predetermined time period, e.g., every five minutes during a competition, or automatically in real-time, or upon request by a user or player. In some embodiments, updating the metadata of the NFT, or the metadata of the digital asset secured by the NFT, specifically the editable attribute, accounts for non-virtual conditions associated with the specified parcel. For example, the shot distance may influence how the editable attribute is updated, such that greater shot distances may have greater statistical significance and, thus, may result in a rarer value with lower statistical quantity. Activities can include a variety of non-virtual events or conditions, such as, e.g., golf club type, player scores, shot starting location, shot ending location, shot distance, swing speed, weather conditions, golf ball type, impact location, among others.

Figure 9:
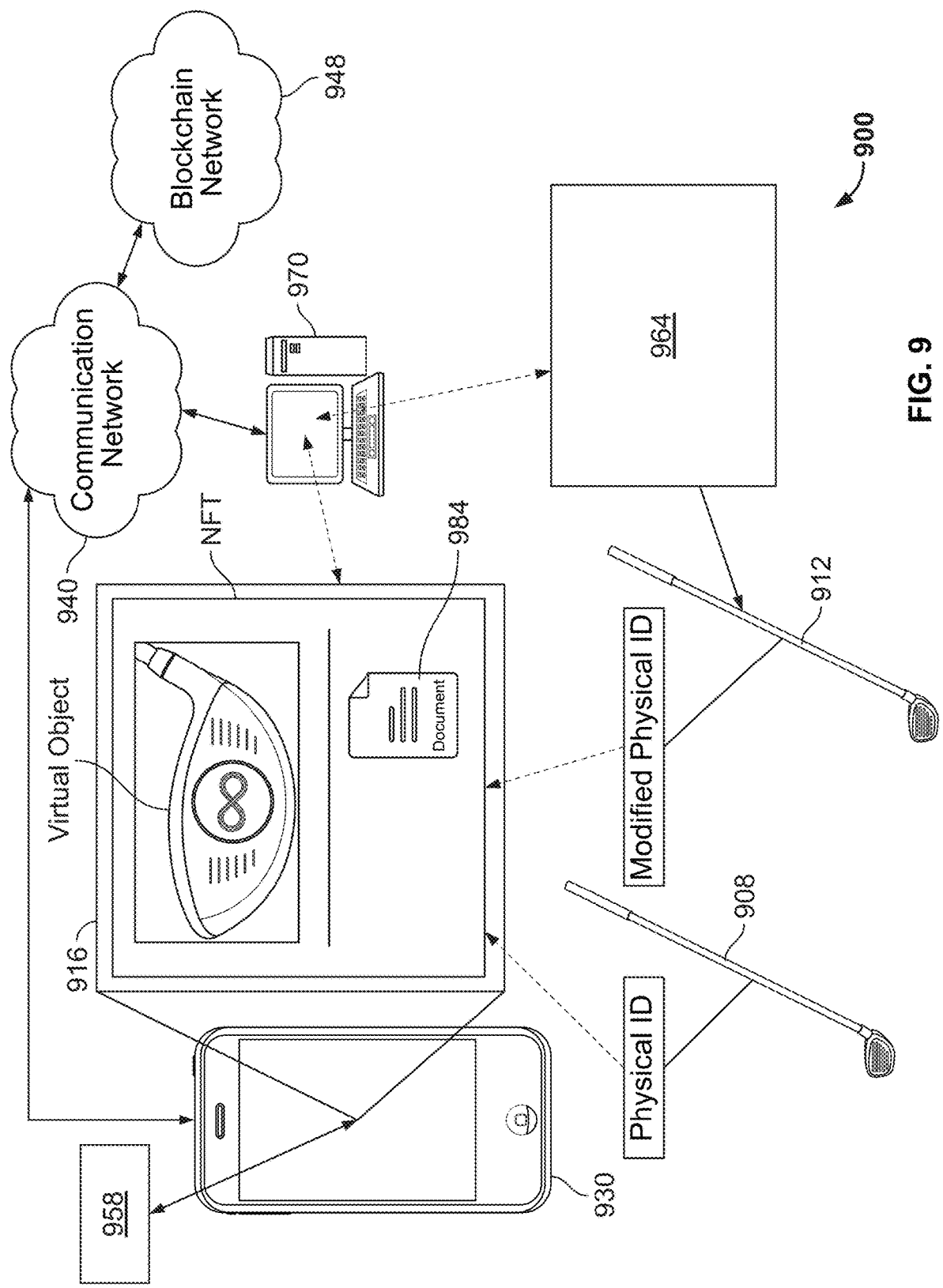
FIG. 9 depicts a production system, according to an embodiment of the present disclosure.

Turning to FIG. 9, a production system 900 may be provided that allows custom modifications to the physical golf club to be recorded as data, e.g., modifying or adding segments to the physical ID, which is capable of being updated in the metadata of the NFT. For example, the Brand may offer a stock or base model of a physical golf club 908 having a corresponding physical ID. The Brand can also offer customization services, such as, e.g., shaft length adjustment, engraving or embossing initials on the club head, exchanging a weight insert or a face insert, weight distribution and/or $C_G$-customization, or other modifications. Each customization service may be associated with a unique ID that can be included with the physical ID of the physical golf club, such that the physical ID of the physical golf club is modified to correspond to the modification of the customization service, resulting in a modified physical ID associated with a modified or customized golf club 912. In some embodiments, multiple customization services may be performed on the physical golf club and, thus, multiple unique IDs may be included with the physical ID. After the physical ID is updated with the unique ID of the customization service, the updated physical ID of the physical golf club or the unique ID alone may be communicated to a digital platform 916 through the user device 930 to update the metadata of the NFT or the metadata of the digital asset associated with the NFT, linked to the physical golf club 908. The user device 930 is in communication with the digital platform 916 via a communication network 940, which operates similarly to the communication networks 130, 638. A blockchain network 948 and a digital wallet 958 are accessible through the communication network 940. In the illustrated embodiments, the user device 930 is configured to display the digital platform 916 where the NFT can be accessed. In some embodiments, the NFT can be viewed from a different platform or program than the digital platform 916.

The production system 900 includes a manufacturing system 964, which may include an additive manufacturing system, such as a 3D printer capable of working with metal materials, such as stainless steel, aluminum, titanium, or metal blends or alloys, such as carbon and plastics. Further, the manufacturing system 964 can be configured to perform a variety of manufacturing techniques, such as computer numerical control (CNC) machining, fused filament fabrication (FFF), direct metal laser sintering (DMLS), atomic diffusion additive manufacturing (ADAM), cold spray additive manufacturing (CSAM), metal injection molding (MIM), or the like. The manufacturing system 964 is in communication with a computing device 970 that is connected to the communication network 940. Accordingly, the manufacturing system 964 is configured to communicate with the digital platform 916 via the computing device 970. The manufacturing system 964 used to modify or manufacture the golf club 912 or components thereof, such as the golf club head 646 or the shaft 642, can include any of the systems or methods described in U.S. patent application Ser. Nos. 16/852,327, 16/852,330, 16/933,129, 16/815,303, 16/852,332, and 16/852,324, which are all commonly assigned to PUMA SE and incorporated by reference herein in their entireties. Additionally, the manufacturing system 964 may be used to modify or manufacture other articles, such as a headcover for a golf club, and may include the systems and methods described in U.S. application Ser. No. 17/012,837, which is assigned to PUMA SE and incorporate by reference herein in its entirety.

The NFT can represent a digital asset that includes a virtual object 980 and a design model 984. The design model 984 may be a computer aided design (CAD) file, which may be converted to a stereo lithography (.stl) file that can instruct the manufacturing system 964 for processing. Additionally or alternatively, a variety of CAD file formats may be used, such as, e.g., STEP, QIF, JT, 3D PDF, IGES, ACIS, Parasolid, among other suitable file formats for communicating with the manufacturing system 964. The NFT represents a digital asset that includes the design model and metadata associated with the design model. The design model may be hosted off-chain on a server or computing device and accessible through the NFT via a URL. Further, metadata of the NFT or associated digital assets can include attributes or properties that are hosted off-chain on a server or computing device and accessible through the NFT via a URL. The attributes or properties may be editable or mutable by authorized users, such as employees or affiliates of the Brand, or certain third-parties, or purchasers of the NFT. The design model is configured to represent the golf club with specifications that are unique to the user, or which are capable of being edited and customized to become unique to the user. That is, by accessing the attributes of the metadata, or by accessing the design model itself, the user may customize the golf club represented by the design model. To that end, the Brand may provide access to the digital platform 916 that is configured to display the NFT.

In the illustrated embodiment, the NFT held by the user, such as in the digital wallet 958, includes the design model 984 and is integrated with or accessible through the digital platform 916. In some instances, the user 604 may select certain customization services to be performed on the stock golf club 908. In some examples, the user has possession of the stock golf club 908 and must then ship or deliver the stock golf club 908 to the Brand; alternatively, the Brand may pull the stock golf club 908 from their inventory upon receiving a request to perform a customization service. The virtual object 980 of the NFT may be a virtual representation of the stock physical golf club 908, or the virtual object 980 may be an artistic rendering of a golf club, or any item or object corresponding to the physical item being customized in the production system 900. The design model 984 may be used to generate the virtual object 980, or the virtual object 980 may be generated and stored separately from the design model 984. The virtual object 980 may be modifiable, such that customizations to the stock physical golf club 908 are reflected in the virtual object 980.

Figure 10:
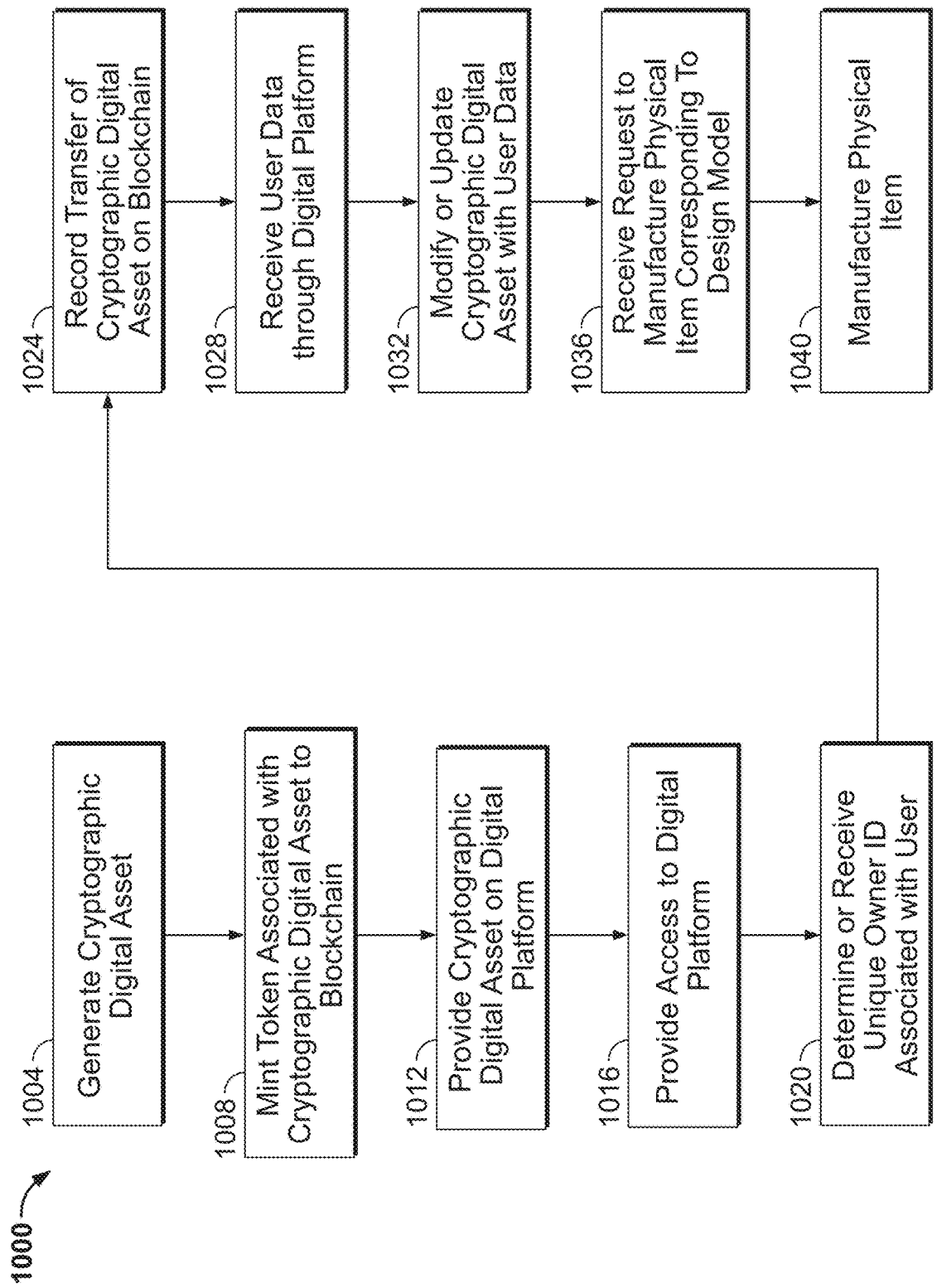
FIG. 10 depicts a flowchart for an example process of a custom manufacture or modification of a golf club using the production system of FIG. 9.

With reference to FIG. 10, a process 1000 of using the production system 900 may include several steps, which may be sequenced or arranged in a variety of ways. In Step 1004, the Brand generates a cryptographic digital asset, to include the virtual object 980 and metadata. The digital asset may include the design model 984 in the metadata, or the design model may be included with the virtual object 980. In Step 1008, the Brand mints an NFT to the blockchain network 948, thereby recording the creation date and transaction data associated with the NFT and design model. The NFT can then be used to authenticate the cryptographic digital asset, which can, for example, include the virtual object 980, the design model 984, and any associated metadata. In Step 1012, the Brand provides access to the digital platform 916 through which users may access, view, and conduct transactions with the NFT. The digital platform 916 may require users to enter login information or to register an account to access the digital platform 916 for access or use, as in Step 1016. Then, the Brand can determine or receive a unique owner ID associated with that particular user upon registration to the digital platform 916, as in Step 1020. Such registration may require the user to link their digital wallet 958 to the digital platform 916 to conduct transactions and authenticate the unique owner ID, as described in process 500.

After the user has linked the digital wallet 958 to the digital platform 916, the user can access the NFTs that authenticate the design models. That is, the NFTs are offered for purchase on the digital platform 916 by registered users. Accordingly, as in Step 1024, users may select the NFT and initiate a transaction to transfer the NFT to the linked digital wallet 958, and such transaction is recorded on the blockchain network and the NFT is stored in the user's digital wallet 958. In Step 1028, the digital platform may receive user data or information for customization of the stock golf club 908, or for the custom manufacture of an entire golf club or clubs. Accordingly, the user may select various editable customization features to build the customized golf club or clubs. The editable customization features may be selected from a menu of predetermined settings or styles or features or aspects, such as, e.g., golf club type, golf club model, right or left handedness, shaft length, shaft stiffness, shaft materials, loft angle, lie angle, face angle, coefficient of resistance (COR), moment of inertia (MOI), striking face patterns or milling, insert or filler material density, and grip type. In some embodiments, additional aspects of the golf club may be selected and configured based on user input, such as, e.g., color, finish, club head materials, center of gravity ($C_G$), ideal impact location, sensor type, sensor configuration, embossing or engraving, location and/or configuration of machine-readable identifiers, and the like. In this way, the digital platform 916 offers users the ability to build the customized golf club or clubs 912. Accordingly, users having greater experience and knowledge of the game of golf and golf clubs will be capable of specifying the features and aspects to build their golf club or clubs. In some embodiments, the digital platform 916 offers a customization guide that receives information in the form of a selection of predetermined criteria specific to the user's age, height, weight, sex, right or left handedness, skill level, and preferences to generate a set of options or recommendations of customized golf clubs built for the user to select from. In this way, the digital platform 916 builds the customized golf club or clubs 912 to suit the user' preferences. Accordingly, users with less experience and knowledge of golf and golf club will prefer the customization guide where answering more basic, personalized questions about themselves and their experience allow the digital platform 916 to build the golf club or clubs to suit their needs.

During or after the user data is received through the digital platform 916, the design model and/or attributes of the metadata of the digital asset secured by the NFT associated with the design model are updated based on the user data, as in Step 1032. That is, the design model 984 is updated to represent the customized golf club or clubs 912 based on the aspects and features selected by the user, or based on the selected options or recommendations provided by the customization guide. Upon finalization of the customized golf club 912, the digital platform 916 may receive a request to manufacture the physical customized golf club or clubs 912 corresponding to the design model 984 specifications of the customized golf club authenticated by the NFT, as in Step 1036. In some embodiments, the request includes the unique owner ID of the user for verification. In some embodiments, a transaction is recorded on the blockchain network to represent the request to manufacture the customized golf club. For example, the request may include the user transferring the NFT to the Brand to initiate the manufacture of the customized golf club or clubs. In some embodiments, the request may be a separate transaction that is linked to the NFT or the associated digital asset, such that the metadata, which may be the attributes, are updated based on the transaction. Then, in Step 1040, the Brand utilizes the manufacturing system 964 to manufacture the physical golf club or clubs corresponding to the design model 984 authenticated by the NFT. In some embodiments, the design model 984 may contain software instructions associated with the customized golf club or clubs for use with the manufacturing system 964.

In some embodiments, the Brand or the user 604 can initiate the communication of the updated physical ID or unique ID to the digital platform 916 to update the metadata of the digital asset secured by the NFT. In some embodiments, where the customized golf club 912 is used with the golf system 600, the digital platform 916 will automatically update the metadata of the NFT upon recognition of the golf system 600. In some embodiments, the base model of the physical golf club and the NFT are pre-linked, prior to purchase, and offered by the Brand as a package. Thus, the NFT already includes the physical ID of the physical golf club 908 or 912. In some embodiments, the NFT may be linked to a set of physical golf clubs, or to a golf ball, or to other articles, such as, e.g., footwear, a golf bag, headcovers, apparel, or the like.

The Brand may use the production system 900 to offer custom manufactured golf clubs to select users or to a select echelon of users holding certain digital assets. To that end, the Brand generates digital assets in the form of NFTs that authenticate design models, such as the design model 984, that are configured provide instructions readable by an additive manufacturing system, such as the manufacturing system 964, for manufacturing a customized physical golf club, such as golf club 912, represented by the design model. The design model may correspond to a single golf club, such that users may purchase multiple NFTs with design models to accumulate a full set of clubs. In some embodiments, one design model may be inclusive of multiple golf clubs or a full set of clubs. The Brand may mint the NFT to a decentralized ledger, such as a blockchain network 948. The blockchain network may be a permissionless, public ledger, such as Ethereum. In some embodiments, the blockchain network is private and requires authentication and permission for only authorized users. In such instances, the Brand may be the corporate host or administrator of the private blockchain network and, thus, the Brand may determine which individuals or entities can be authorized users.

Figure 11:
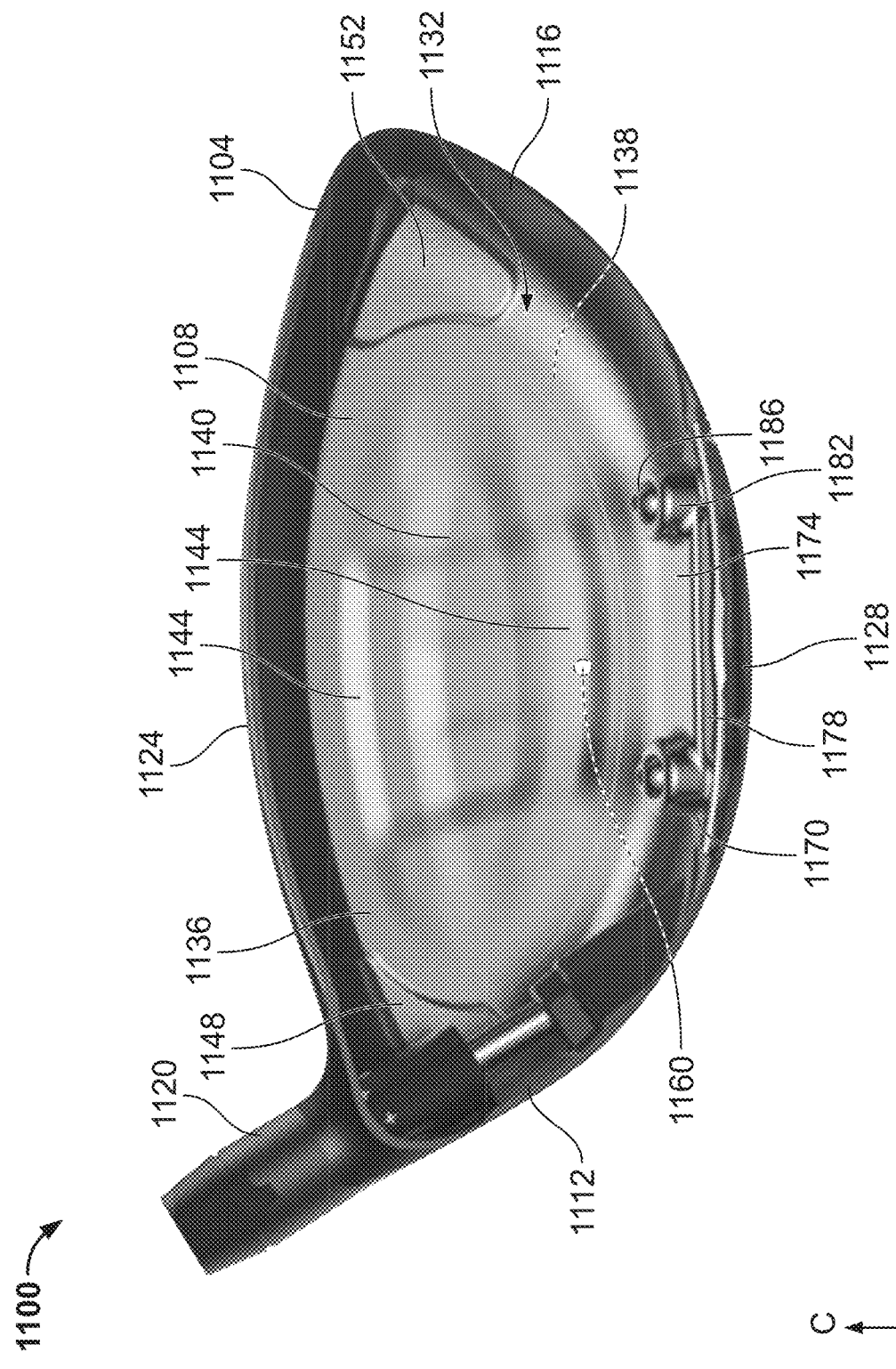
FIG. 11 depicts a rear, cut-away view of a golf club head, according to an embodiment of the present disclosure.
Figure 12:
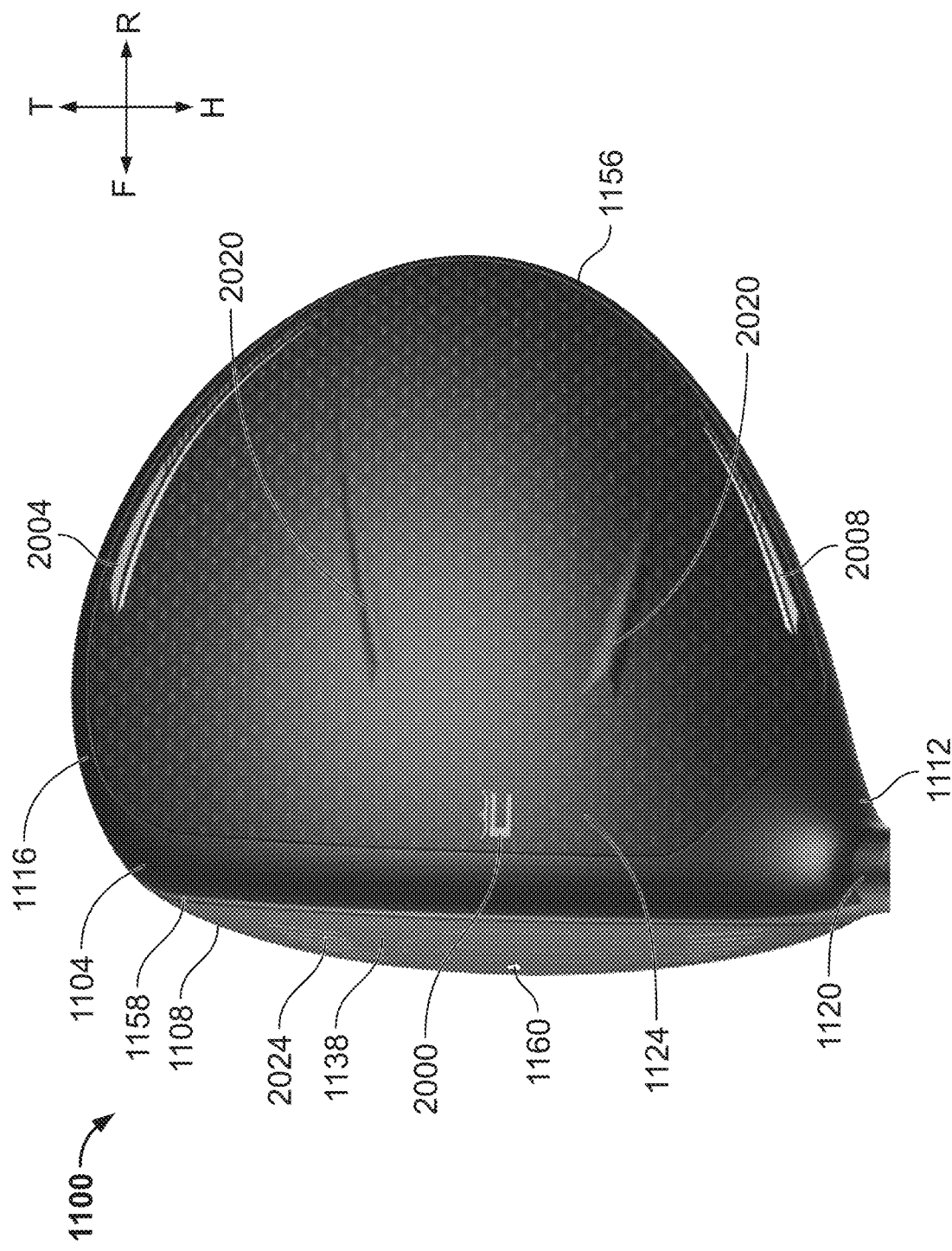
FIG. 12 is a top plan view of the golf club head of FIG. 11.

FIGS. 11 and 12 illustrate an embodiment of a golf club head 1100 that may be custom manufactured and/or modified in accordance with the process of 1000 of FIG. 10 and the production system 900 of FIG. 9. In the illustrated embodiment of FIG. 11, the golf club head 1100 includes a body 1104 and a face member or face insert 1108 extending between a heel end 1112 and a toe end 1116. A hosel 1120 extends from the heel end 1112 of the golf club head 1100. In some embodiments, the hosel 1120 is an adjustable hosel, such that the loft and lie angles may be adjusted, among other configurations. The body 1104 of the golf club head 1100 includes a crown 1124 that is opposite a sole 1128. In some embodiments, the body 1104 is a unitary component, such that the crown 1124 and the sole 1128 are integrally formed. In some embodiments, the body 1104 is a multi-piece structure, such that the crown 1124 and the sole 1128 are separable and distinct components of the golf club head 1100 which require assembly. Further, the face member 1108 may be integrally formed with the body 1104, or the face member 1108 may be a separable and distinct component requiring assembly with the body 1104 to form the golf club head 1100. It will be appreciated that although the golf club head 1100 resembles a driver-type golf club head, aspects of the golf club head 1100 described herein, and the usage of the golf club head 1100 with the methods and systems described herein, shall not be limited to such driver-type golf club heads. It is contemplated that the golf club head 1100 may be a hybrid-type golf club head, a putter-type golf club head, an iron-type golf club head, or the like.

It will be appreciated that FIG. 11 is a rear, cut-away view of the golf club head 1100 that includes an interior volume or internal void 1132, such that the golf club head 1100 is hollow. The internal void 1132 may be defined by the face member 1108 and the body 1104, such that assembly or integral formation thereof encloses the internal void 1132. In some embodiments, the internal void 1132 is defined entirely by the body 1104, or the face member 1108 may define internal voids 1132 therein. For illustrative purposes, a coordinate system is depicted in FIGS. 11 and 12 as including opposing heel H and toe T directions, opposing crown C and sole S directions, and opposing front F and rear R directions. For purposes of clarity, the crown C and sole S directions may be referred to in combination as the crown-sole (C-S) direction or vertical direction, the heel H and toe T directions may be referred to in combination as the heel-toe (H-T) direction or lateral direction, and the front F and rear R directions may be referred to in combination as the front-rear (F-R) direction or longitudinal direction.

Still referring to FIG. 11, the face member 1108 of the golf club head 1100 includes a rear surface 1136 that is opposite a front surface 1138, which is indicated by a dashed portion of the lead line extending around the golf club head 1100. The front surface 1138 at least partially defines the striking face that impacts a golf ball (not shown) during use. In the illustrated embodiment, the rear surface 1136 is configured to face the internal void 1132 and includes a plurality of raised portions 1140, 1144 and a plurality of recessed portions 1148, 1152. It will be appreciated that the raised portions 1140, 1144 extend rearwardly along the front-rear direction, toward a rear side 1156 (see FIG. 12) of the golf club head 1100, which is opposite a front side 1158 of the golf club head 1100 where the face member 1108 is positioned. In some embodiments, the raised portions 1140, 1144 increase a thickness, i.e., a dimension measured in the front-rear direction, of the face member 1108 relative to the front surface 1138. Further, the recessed portions 1148, 1152 may decrease the thickness of the face member 1108 relative to the front surface 1138.

Using the production system 900 and process 1000 described above, the Brand may offer users 604 the ability to customize the face member 1108, such as by locating, arranging, sizing, and shaping the raised portions 1140, 1144 and/or the recessed portions 1148, 1152 of the face member 1108. For instance, users 604 may desire increased thickness in areas of the face member 1108 corresponding with a custom impact point or location 1160, which is represented by an imaginary white dot for purposes of clarity, to provide customized performance properties, i.e., coefficient of resistance (COR), center of gravity ($C_G$), MOI, ball spin correction, among others. The impact point 1160 may be determined through use of a fitting system to generate fit data, i.e., measured data associated with a particular user's golf swing and performance tendencies. In some instances, users, e.g., the user 604, may desire reduced thickness in areas of the face member 1108 surrounding the impact point 1160, such as near the heel end 1112 and/or the toe end 1116, to provide such customized performance properties, e.g., reducing weight near the toe end 1116 to prevent opening the face during impact or to improve flexibility of the face member 1108. In some embodiments, users may customize the face member 1108 to provide decreased thickness in areas corresponding with the impact point 1160 to provide a trampoline effect, while the surrounding areas of the face member 1108 are stiffened or reinforced with increased thickness to reduce or mitigate vibration. Accordingly, users can produce such customized face members 1108 with raised portions 1140, 1144 and recessed portions 1148, 1152 using the production system 900 and the process 1000. Additionally, the customized face member 1108 may be represented by the virtual object 980 and authenticated by the NFT. In this way, users are afforded a visual depiction of the customized face member 1108, particularly the customized pattern or arrangement on the rear surface 1136 that is often concealed and inaccessible to users without permanent deformation of the golf club head 1100. Further, users may store data associated with their customized face member 1108, such as the relative or geometric locations of the impact point 1160 and/or the center of gravity ($C_G$), in the metadata of the digital asset secured by the NFT for authentication of a user's arrangement or "fingerprint" on the golf club head 1100.

Accordingly, the face member 1108 may be custom manufactured with the production system 900 using the additive manufacturing system, such as a 3D printer capable of working with metal materials, such as stainless steel, aluminum, titanium, or metal blends or alloys, such as carbon and plastics. In some embodiments, the raised portions 1140, 1144 may be provided in the form of ribs or ridges or beams or posts extending from and/or along the rear surface 1136 of the face member 1108. Further, the recessed portions 1148, 1152 may be formed along the rear surface 1136 between or beneath the raised portions 1140, 1144 formed as ribs. Further, the face member 1108 may include a hollow interior between the front surface (not shown) and the rear surface 1136 in which a lattice structure or stiffening members, e.g., ribs and ridges, may be formed.

With continued reference to FIG. 11, the golf club head 1100 includes an insert 1170 disposed within the internal void 1132. In the illustrated embodiment, the insert 1170 includes an upper rib 1174 and a lower rib 1178 spanning between a set of posts 1182, and the insert 1170 is attached to the body 1104 by a set of fasteners 1186. The insert 1170 may be provided in the internal void 1132 of the golf club head 1100 for customization of various performance properties, e.g., the center of gravity ($C_G$), MOI, sound performance, feel, among others. In some embodiments, the insert 1170 is attached to the face member 1108 or to another portion of the body 1104, e.g., the crown 1124, the heel end 1112, the toe end 1116, or some combination thereof, in addition or alternatively to being attached to the sole 1128. In some embodiments, the insert 1170 is attached to the body 1104 or the face member 1108 by an interference fit, or by fusion, welding, adhesive, or compression. In some embodiments, the insert 1170 is sized and shaped differently than shown, such that the insert 1170 may be a lattice structure, a plurality of ribs or posts or thickened areas, or the like. The insert 1170 may be shaped to resemble a sphere, a square or cube, a rectangle or box, a triangle or triangular-shaped prism, a polygon or polygon-shaped prism, a bridge or truss, an alphanumeric symbol, irregular shapes, or a series or array or pattern of shapes. The insert 1170 may be integrally formed and then attached to the golf club head 1100, or the insert 1170 may be formed of multiple separable components that are pre-assembled before being attached or inserted into the golf club head 1100. Accordingly, the insert 1170 may be custom manufactured using the production system 900, with any of the additive manufacturing systems described above, and the process 1000. Additionally, the customized insert 1170 may be represented by the virtual object 980 and authenticated by the NFT. In this way, users are afforded a visual depiction of the customized insert 1170 that is often concealed and inaccessible to users without permanent deformation of the golf club head 1100. Further, users may store data associated with their customized insert 1170, such as the particular shape, size, material compositions, attachment methods, quantity, volume, location, and/or the center of gravity ($C_G$), in the metadata of the NFT for authentication of the user's arrangement or "fingerprint" on the golf club head 1100.

Referring to FIG. 12, the golf club head 1100 may be manufactured to include a plurality of markings thereon, including a first marking 2000 positioned adjacent a front side 1158 and located substantially centrally between the heel end 1112 and the toe end 1116, a second marking 2004 positioned adjacent the toe end 1116, and a third marking 2008 positioned adjacent the heel end 1112. In the illustrated embodiment, the first marking 2000 is depicted as a logo or emblem, although the first marking 2000 may be any symbol, code, cipher, indicia, or the like. The first marking 2000 may be provided to aid a user in aligning the golf club head 1100 with a golf ball (not shown) at address. The second and third markings 2004, 2008 are depicted as indicia comprising curved stripes or bars, which are mirrored relative to each other. The first, second, and third markings 2000, 2004, 2008 are depicted as being provided on the crown 1124, although other configurations are possible. In some embodiments, the crown 1124 may be provided with first, second, and third markings 2000, 2004, 2008 through implementation of the manufacturing system 964 of the production system 900, such that the markings 2000, 2004, 2008 are integrally formed with the crown 1124.

Further, at least one of the markings 2000, 2004, 2008 may contain a code or identifier, such as, e.g., a machine-readable identifier. The code can be used to authenticate the golf club head 1100, such that the code is associated with a serial number or unique ID, or a token or key, which can be scanned by, e.g., the user device 110 or 630, which may be a smartphone or special purpose scanning device, such as those employing near field communication (NFC) technologies, or the like. The code may correspond to encoding parameters stored in a remote host system, such as the Brand host system 424 or the digital platform 416 or 916, and the encoding parameters can include a manufacturing date, manufacturing location, identification of the manufacturer, serial number or unique ID, numbers associated with modifications or customized features, aspects of the golf club head, such as model and type, materials, numbers associated with the quantity of items produced, such as for limited edition products, among others. Further, the code may require the user device 110, 630 or scanning device to implement symmetric or asymmetric encoding algorithms or methods, such as, e.g., advanced Encryption Standard (AES), Rivest-Shamir-Adleman (RSA), Triple Date Encryption Standard (DES), Twofish, or any other suitable encryption method. In some instances, the code may be compatible with hashing functions or algorithms implemented by the user device 110, 630 or scanning device, such as, e.g., Secure Hash Algorithms (SHA) published by the National Institute of Standards and Technology (NIST), or equivalents. It is contemplated the user device 110, 630 or the scanning device must run particular operating systems or applications to implement such methods for reading the code, although in some instances the code may be pre-programmed to, upon detection by a sensor or camera, automatically initialize a browser to search a web address (e.g., a URL) for accessing the necessary software to read the code.

The code may resemble a barcode, such as the Ticket ID of FIG. 1, or the code may be a QR code, or a cipher containing unique symbols or unique combinations of symbols, or colors, or the like. As illustrated in FIG. 12, the second and third markings 2004, 2008 include indicia comprising stripes and bars which can be printed on the crown 1124 in accordance with the encoding algorithm that determines the appropriate identifying aspects of the indicia, such as the size, color, shape, and arrangement of the strips and bars, to store and communicate information. In some embodiments, the markings 2000, 2004, 2008 may be formed with conductive ink or ferromagnetic elements comprising the code. For example, the markings 2000, 2004, 2008 may include conductive ink arranged to comprise electrical resistance values in discrete, predetermined locations, such that the combination of such values corresponds to a serial number or unique ID associated with the golf club head 1100. In some instances, the crown 1124 is formed with embedded ferromagnetic elements or ferrimagnetic elements which are arranged to form magnetic zones having discrete, predetermined magnetic property values, e.g., magnetic flux density values, such that a magnetometer, e.g., a gaussmeter or teslameter, may be used to measure the magnetic property values that, in combination, correspond to the serial number or unique ID associated with the golf club head 1100. When scanned, the code may enable access, via the user device 110 or 630, to the digital platform 416 or 916, or to a secured website or address or application that is hosted remotely having at least part of a cryptographic key or token, such as the ModToken or private key, which corresponds to or unlocks a digital asset secured by an NFT, which includes the design model 984 or the unique ID or serial number associated with the golf club head 1100. In this way, the golf club head 1100 may be authenticated by the user for assurance that the golf club head 1100 is manufactured by the Brand. Further, the code may provide authentication of the custom features of the golf club head 1100. Additionally, the crown 1124 may be provided or formed with aerodynamic features 2020 that form a topology that can comprise the code or part of the code that is scanned. Additionally, the face member 1108 may include similar machine-readable identifiers, such as in grooves 2024 formed on the front surface 1138, as illustrated in FIG. 12.

In some embodiments, the code of the golf club head 1100 is readable by authorized third-parties for tracking purposes. For example, entities throughout the supply chain, such as shipping companies, may scan the code for tracking purposes. In some instances, the code may be used for inventory tracking purposes, such that wholesalers, retailers, and fitting professionals may scan the code to update an inventory management system. In some examples, the web address or digital platform 916 may be capable of tracking and recording the identity, such as the device ID or product ID, of each entity that has obtained access. Further, the user may be given the ability to access the web address prior to receipt of the golf club head 1100, such as via an email or secure notification through or on the digital platform 916. In this way, the code may assist the user in locating the golf club head 1100 in the event of loss or theft, or to identify unauthorized access by, e.g., counterfeiters.

In some embodiments, any suitable computer readable media can be used for storing instructions for performing the functions and/or processes described herein. For example, in some embodiments, computer readable media can be non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media.

FIGS. 13-16 illustrate another embodiment of a golf club head 3100 that may be custom manufactured and/or modified in accordance with the process of 1000 of FIG. 10 and the production system 900 of FIG. 9. The golf club head 3100 is generally similar to the golf club head 1100, and includes similar numbering for similar features. In the illustrated embodiment of FIG. 13, the golf club head 3100 includes a body 3104 and a face member or face insert 3108 (see FIG. 14) extending between a heel end 3112 and a toe end 3116. A hosel 3120 extends from the heel end 3112 of the golf club head 3100. In some embodiments, the hosel 3120 is an adjustable hosel, such that the loft and lie angles may be adjusted, among other configurations. The body 3104 of the golf club head 3100 includes a topline 3124 that is opposite a sole 3128. In some embodiments, the body 3104 is a unitary component, such that the topline 3124 and the sole 3128 are integrally formed. In some embodiments, the body 3104 is a multi-piece structure, such that the topline 3124 and the sole 3128 are separable and distinct components of the golf club head 3100 which require assembly. Further, the face member 3108 may be integrally formed with the body 3104, or the face member 3108 may be a separable and distinct component requiring assembly with the body 3104 to form the golf club head 3100. As shown, the golf club head 3100 resembles an iron-type golf club head.

Figure 16:
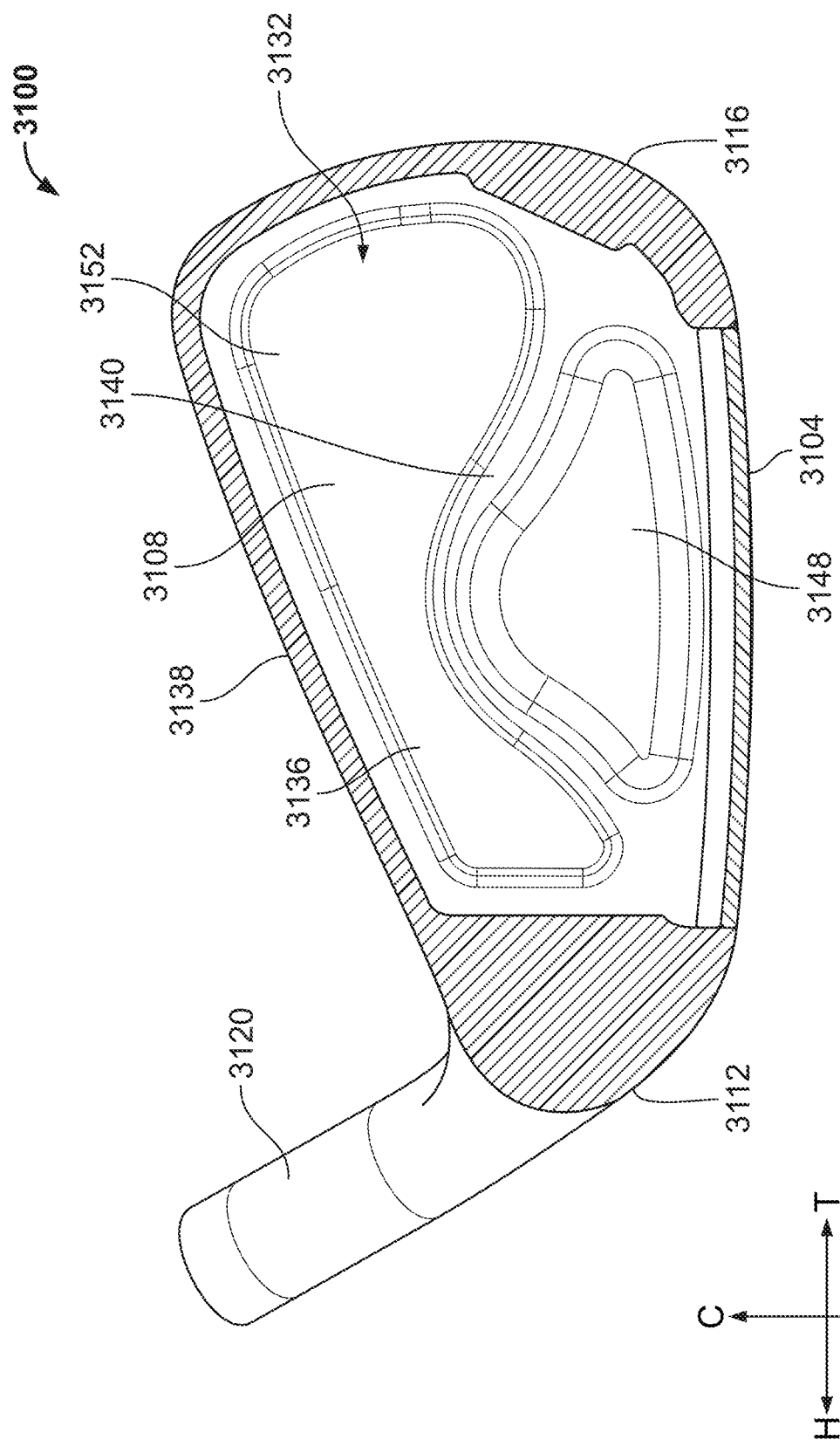
FIG. 16 is a rear cut-away view of the iron-type golf club head of FIG. 13.

It will be appreciated that FIG. 16 is a rear, cut-away view of the golf club head 3100 that includes an interior volume or internal void 3132, such that the golf club head 3100 is hollow. The internal void 3132 may be defined by the face member 3108 and the body 3104, such that assembly or integral formation thereof encloses the internal void 3132. In some embodiments, the internal void 3132 is defined entirely by the body 3104, or the face member 3108 may define internal voids 3132 therein. For illustrative purposes, a coordinate system is depicted in FIGS. 13-16 as including opposing heel H and toe T directions, opposing topline To and sole S directions, and opposing front F and rear R directions. For purposes of clarity, the Topline To and sole S directions may be referred to in combination as the crown-sole (C-S) direction or vertical direction, the heel H and toe T directions may be referred to in combination as the heel-toe (H-T) direction or lateral direction, and the front F and rear R directions may be referred to in combination as the front-rear (F-R) direction or longitudinal direction.

Referring to FIG. 16, the face member 3108 of the golf club head 3100 includes a rear surface 3136 that is opposite a front surface 3138, which is indicated by a dashed portion of the lead line extending around the golf club head 3100. The front surface 3138 (see FIG. 14) at least partially defines the striking face that impacts a golf ball (not shown) during use. In the illustrated embodiment, the rear surface 3136 is configured to face the internal void 3132 and includes a raised portion 3140 and a plurality of recessed portions 3148, 3152. It will be appreciated that the raised portion 3140 extends rearwardly along the front-rear direction, toward a rear side 3156 (see FIG. 15) of the golf club head 3100, which is opposite a front side 3158 of the golf club head 3100 where the face member 3108 is positioned. In some embodiments, the raised portions 3140 increase a thickness, i.e., a dimension measured in the front-rear direction, of the face member 3108 relative to the front surface 3138. Further, the recessed portions 3148, 3152 may decrease the thickness of the face member 3108 relative to the front surface 3138.

Using the production system 900 and process 1000 described above, the Brand may offer users 604 the ability to customize the face member 3108, such as by locating, arranging, sizing, and shaping the raised portion 3140 and/or the recessed portions 3148, 3152 of the face member 3108. For instance, users 604 may desire increased thickness in areas of the face member 3108 corresponding with a custom impact point or location 3160 (see FIG. 14), to provide customized performance properties, i.e., coefficient of resistance (COR), center of gravity (CG), MOI, ball spin correction, among others. The impact point 3160 may be determined through use of a fitting system to generate fit data, i.e., measured data associated with a particular user's golf swing and performance tendencies. In some instances, users, e.g., the user 604, may desire reduced thickness in areas of the face member 3108 surrounding the impact point 3160, such as near the heel end 3112 and/or the toe end 3116, to provide such customized performance properties, e.g., reducing weight near the toe end 3116 to prevent opening the face during impact or to improve flexibility of the face member 3108. In some embodiments, users may customize the face member 3108 to provide decreased thickness in areas corresponding with the impact point 3160 to provide a trampoline effect, while the surrounding areas of the face member 3108 are stiffened or reinforced with increased thickness to reduce or mitigate vibration. Accordingly, users can produce such customized face members 3108 with the raised portion 3140 and the recessed portions 3148, 3152 using the production system 900 and the process 1000. Additionally, the customized face member 3108 may be represented by the virtual object 980 and authenticated by the NFT. In this way, users are afforded a visual depiction of the customized face member 3108, particularly the customized pattern or arrangement on the rear surface 3136 that is often concealed and inaccessible to users without permanent deformation of the golf club head 3100. Further, users may store data associated with their customized face member 3108, such as the relative or geometric locations of the impact point 3160 and/or the center of gravity (CG), in the metadata of the digital asset secured by the NFT for authentication of a user's arrangement or "fingerprint" on the golf club head 1100.

Accordingly, the face member 3108 may be custom manufactured with the production system 900 using the additive manufacturing system, such as a 3D printer capable of working with metal materials, such as stainless steel, aluminum, titanium, or metal blends or alloys, such as carbon and plastics. In some embodiments, the raised portions 3140 may be provided in the form of ribs or ridges or beams or posts extending from and/or along the rear surface 3136 of the face member 3108. Further, the recessed portions 3148, 3152 may be formed along the rear surface 3136 between or beneath the raised portion 3140 formed as ribs. Further, the face member 3108 may include a hollow interior between the front surface (not shown) and the rear surface 3136 in which a lattice structure or stiffening members, e.g., ribs and ridges, may be formed.

As discussed with reference to the driver-type club head 1100 of FIG. 12, the iron-type golf club head 3100 can also include a plurality of markings (not shown), which can be positioned substantially similarly to those of golf club head 1100, and can be provided on the topline 3124 or the face 3108. As with markings for club head 1100, markings for the club head 3100 may contain a code or identifier, such as, e.g., a machine-readable identifier. The code can be used to authenticate the golf club head 3100, such that the code is associated with a serial number or unique ID, or a token or key, which can be scanned by, e.g., the user device 110 or 630, which may be a smartphone or special purpose scanning device, such as those employing near field communication (NFC) technologies, or the like. The code may correspond to encoding parameters stored in a remote host system, such as the Brand host system 424 or the digital platform 416 or 916, and the encoding parameters can include a manufacturing date, manufacturing location, identification of the manufacturer, serial number or unique ID, numbers associated with modifications or customized features, aspects of the golf club head, such as model and type, materials, numbers associated with the quantity of items produced, such as for limited edition products, among others. Further, the code may require the user device 110, 630 or scanning device to implement symmetric or asymmetric encoding algorithms or methods, such as, e.g., advanced Encryption Standard (AES), Rivest-Shamir-Adleman (RSA), Triple Date Encryption Standard (DES), Twofish, or any other suitable encryption method. In some instances, the code may be compatible with hashing functions or algorithms implemented by the user device 110, 630 or scanning device, such as, e.g., Secure Hash Algorithms (SHA) published by the National Institute of Standards and Technology (NIST), or equivalents. It is contemplated the user device 110, 630 or the scanning device must run particular operating systems or applications to implement such methods for reading the code, although in some instances the code may be pre-programmed to, upon detection by a sensor or camera, automatically initialize a browser to search a web address (e.g., a URL) for accessing the necessary software to read the code.

Figure 14:
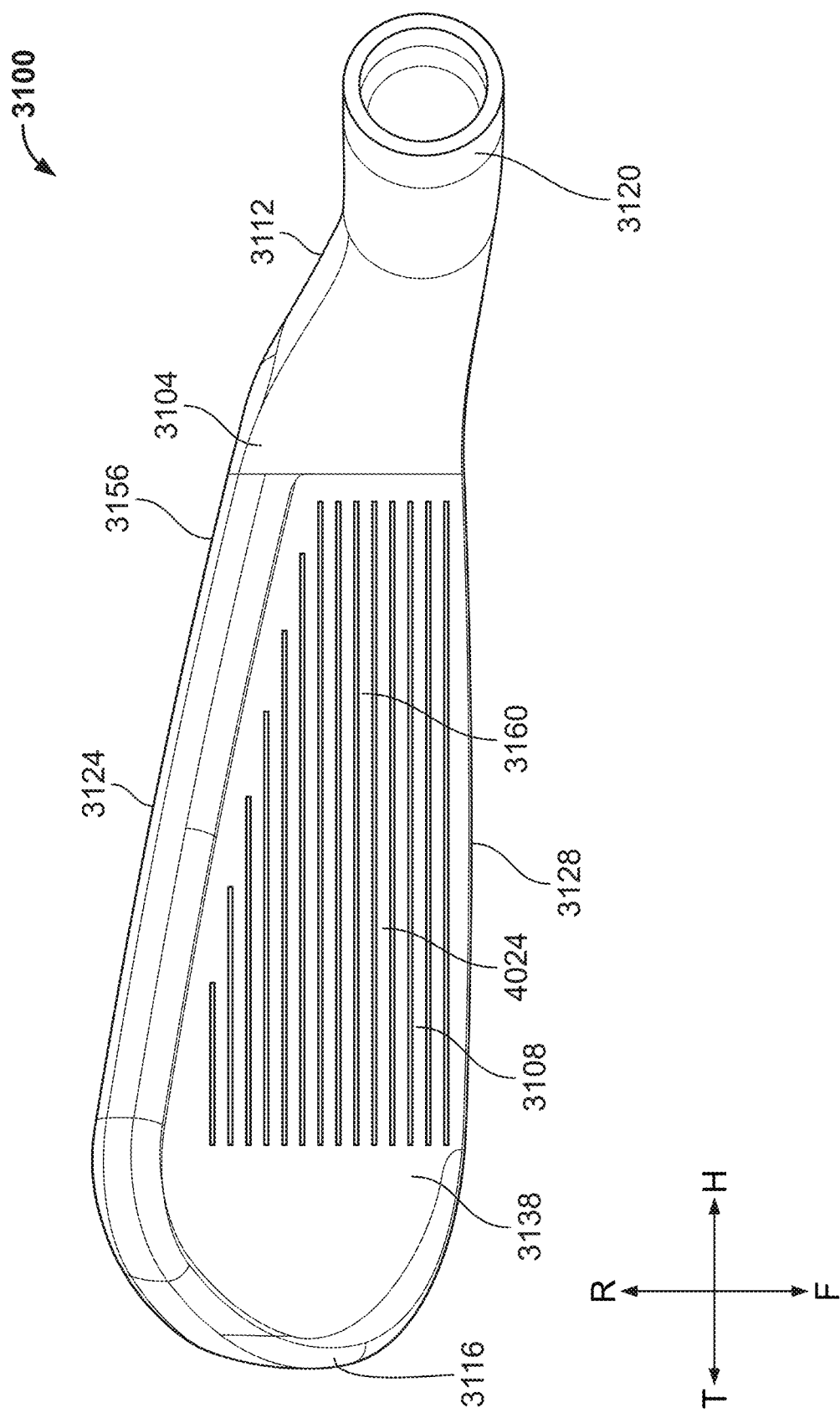
FIG. 14 is a top plan view of the iron-type golf club head of FIG. 13.
Figure 15:
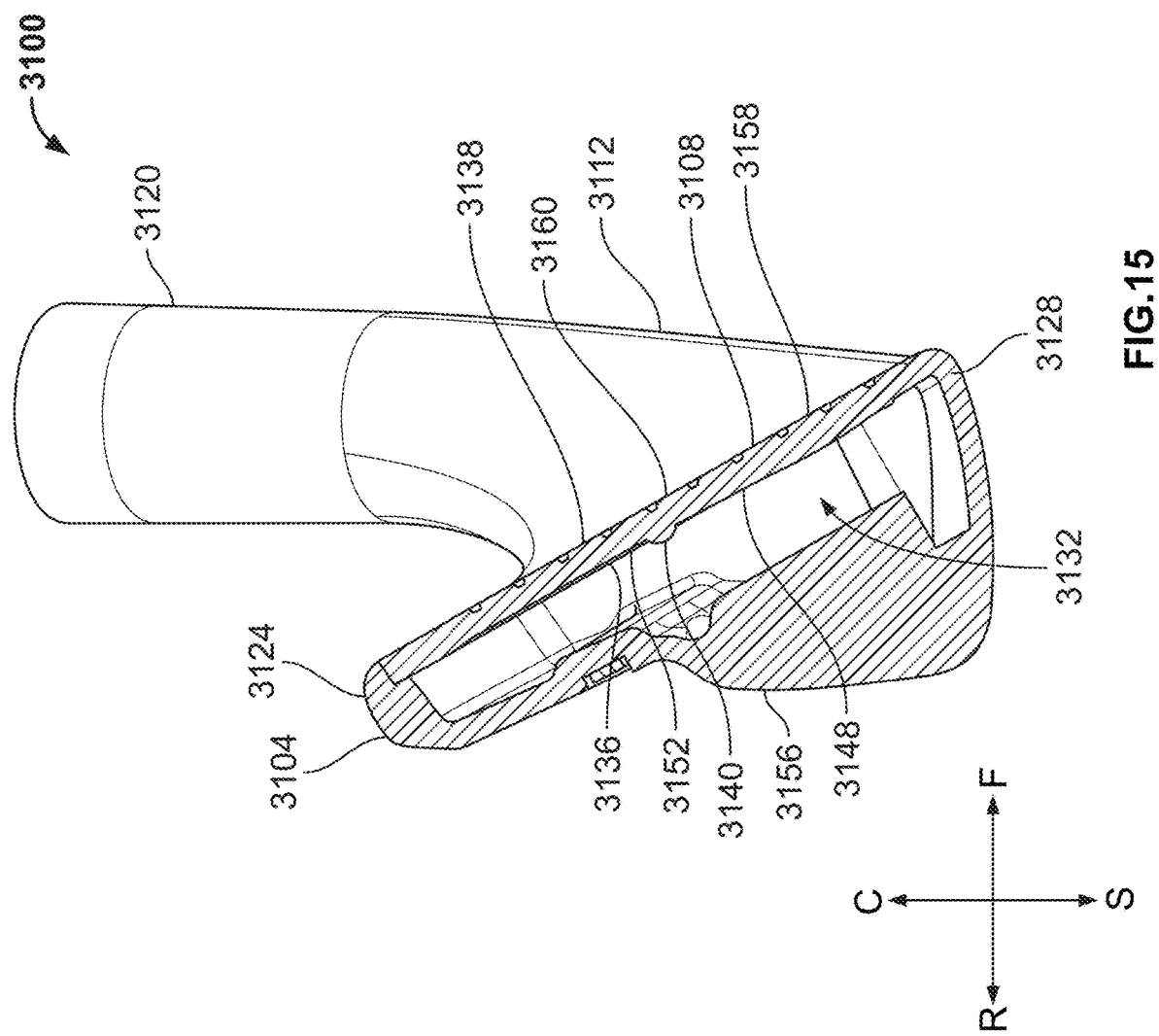
FIG. 15 is a side, cut-away view of the iron-type golf club head of FIG. 13.

The code may resemble a barcode, such as the Ticket ID of FIG. 1, or the code may be a QR code, or a cipher containing unique symbols or unique combinations of symbols, or colors, or the like. In some instances, the topline 3124 is formed with embedded ferromagnetic elements or ferrimagnetic elements which are arranged to form magnetic zones having discrete, predetermined magnetic property values, e.g., magnetic flux density values, such that a magnetometer, e.g., a gaussmeter or teslameter, may be used to measure the magnetic property values that, in combination, correspond to the serial number or unique ID associated with the golf club head 3100. When scanned, the code may enable access, via the user device 110 or 630, to the digital platform 416 or 916, or to a secured website or address or application that is hosted remotely having at least part of a cryptographic key or token, such as the ModToken or private key, which corresponds to or unlocks a digital asset secured by an NFT, which includes the design model 984 or the unique ID or serial number associated with the golf club head 3100. In this way, the golf club head 3100 may be authenticated by the user for assurance that the golf club head 3100 is manufactured by the Brand. Further, the code may provide authentication of the custom features of the golf club head 3100. Additionally, the face member 3108 may include similar machine-readable identifiers, such as in grooves 4024 formed on the front surface 3138, as illustrated in FIG. 14.

In some embodiments, the code of the golf club head 3100 is readable by authorized third-parties for tracking purposes. For example, entities throughout the supply chain, such as shipping companies, may scan the code for tracking purposes. In some instances, the code may be used for inventory tracking purposes, such that wholesalers, retailers, and fitting professionals may scan the code to update an inventory management system. In some examples, the web address or digital platform 916 may be capable of tracking and recording the identity, such as the device ID or product ID, of each entity that has obtained access. Further, the user may be given the ability to access the web address prior to receipt of the golf club head 3100, such as via an email or secure notification through or on the digital platform 916. In this way, the code may assist the user in locating the golf club head 3100 in the event of loss or theft, or to identify unauthorized access by, e.g., counterfeiters.

In some embodiments, any suitable computer readable media can be used for storing instructions for performing the functions and/or processes described herein. For example, in some embodiments, computer readable media can be non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media.

The above-described aspects of the processes of FIGS. 5, 7, and 10 can be executed or performed in any order or sequence not limited to the order and sequence shown and described in the figures. Also, some of the above aspects of the processes of FIGS. 5, 7, and 10 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of manufacturing a golf club using a non-fungible token, the method comprising:
   minting the non-fungible token to a blockchain ledger, the non-fungible token associated with a virtual object and metadata, wherein at least one of the virtual object or metadata includes a design model;
   providing access to a digital platform that is configured to display the non-fungible token;
   determining or receiving a unique owner ID associated with a user upon registration to the digital platform;
   recording, on the blockchain ledger, transfer of the non-fungible token to the user;
   receiving user data through the digital platform;
   modifying the design model with the user data;
   receiving a request to manufacture a physical golf club corresponding to the design model associated with the non-fungible token, the request including the unique owner ID; and
   manufacturing the physical golf club corresponding to the design model associated with the non-fungible token.

2. The method of claim 1, wherein modifying the design model with the user data updates the metadata associated with the non-fungible token.

3. The method of claim 1, wherein the digital platform provides a customization guide that is configured to receive the user data by selection of at least one predetermined criteria.

4. The method of claim 1, wherein the physical golf club includes a golf club head having a face member with raised portions and recessed portions corresponding to a custom impact point associated with the user.

5. The method of claim 4, wherein the raised portions and recessed portions are provided on a rear surface of the face member.

6. The method of claim 4, wherein the face member is represented by the virtual object associated with the non-fungible token.

7. The method of claim 1, wherein the physical golf club includes a golf club head having an insert disposed within an internal void and attached to body of the golf club head.

8. The method of claim 7, wherein the insert comprises a plurality of ribs.

9. The method of claim 7, wherein the insert is represented by the virtual object associated with the non-fungible token.

* * * * *